United States Patent
Hara et al.

(10) Patent No.: US 8,515,402 B2
(45) Date of Patent: Aug. 20, 2013

(54) MOBILE TERMINAL DEVICE, COMMUNICATION SYSTEM, COMMUNICATION PROGRAM, AND CONTROL METHOD

(75) Inventors: Yasushi Hara, Kawasaki (JP); Katsumi Otsuka, Kawasaki (JP); Ryosuke Oishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/552,761

(22) Filed: Jul. 19, 2012

(65) Prior Publication Data
US 2013/0059570 A1 Mar. 7, 2013

(30) Foreign Application Priority Data

Sep. 2, 2011 (JP) ................................. 2011-192047

(51) Int. Cl.
*H04W 4/12* (2009.01)
(52) U.S. Cl.
USPC ........................................ 455/414.1; 704/235
(58) Field of Classification Search
USPC .......... 455/414.1, 566, 418, 567, 41.1, 422.1; 704/235; 370/345
See application file for complete search history.

(56) References Cited

U.S. PATENT DOCUMENTS

2008/0039152 A1* 2/2008 Arisawa .......................... 455/567
2008/0125179 A1* 5/2008 Hamada et al. ................ 455/566

FOREIGN PATENT DOCUMENTS

| JP | 2003-134566 A | 5/2003 |
| JP | 2006-310983 A | 11/2006 |

* cited by examiner

*Primary Examiner* — Phuoc Doan
(74) *Attorney, Agent, or Firm* — Fujitsu Patent Center

(57) ABSTRACT

A mobile terminal device receives information related to a push email service from a mail server, a calendar server, and a phone book server that provide the push email service via a wireless communication network. The mobile terminal device stores therein setting information that indicates whether the information related to the push email service is received at the time of the standby state. Furthermore, the mobile terminal device determines whether to shift the state of the mobile terminal device to a standby state. If the mobile terminal device determines that the mobile terminal device will shift its state to a standby state, the mobile terminal device transmits, on the basis of the stored setting information, a setting notification that instructs the stopping of the push email service to the mail server, the calendar server, and the phone book server.

14 Claims, 27 Drawing Sheets

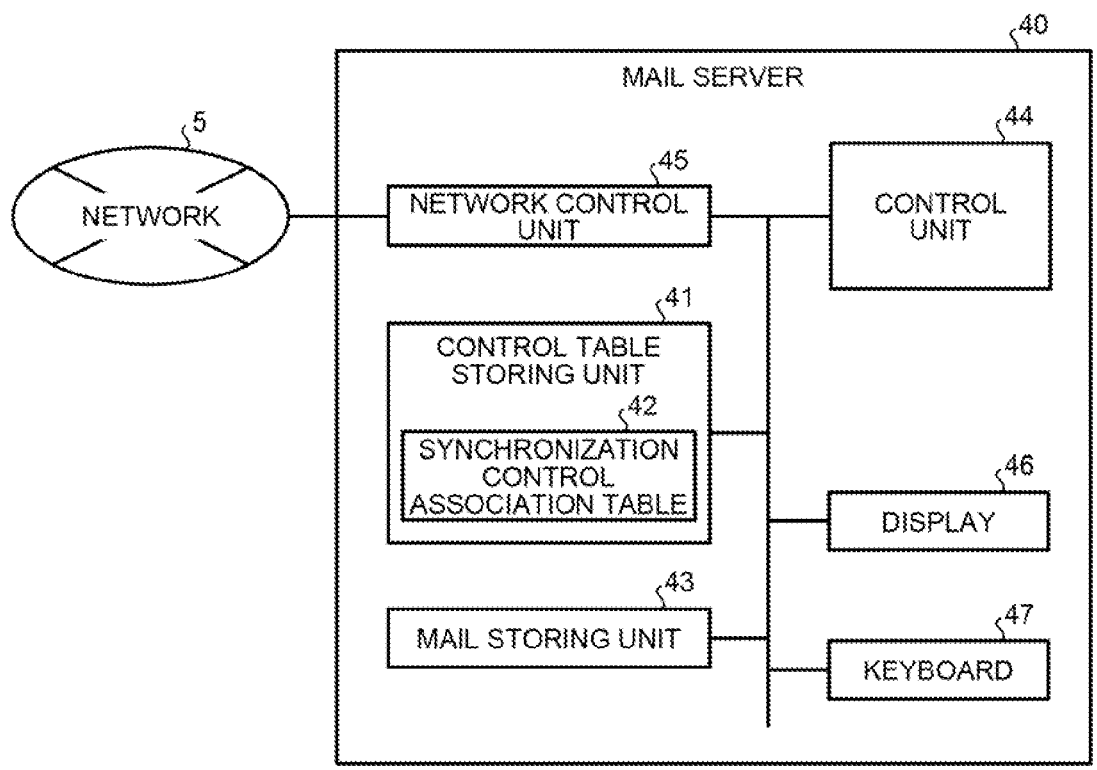

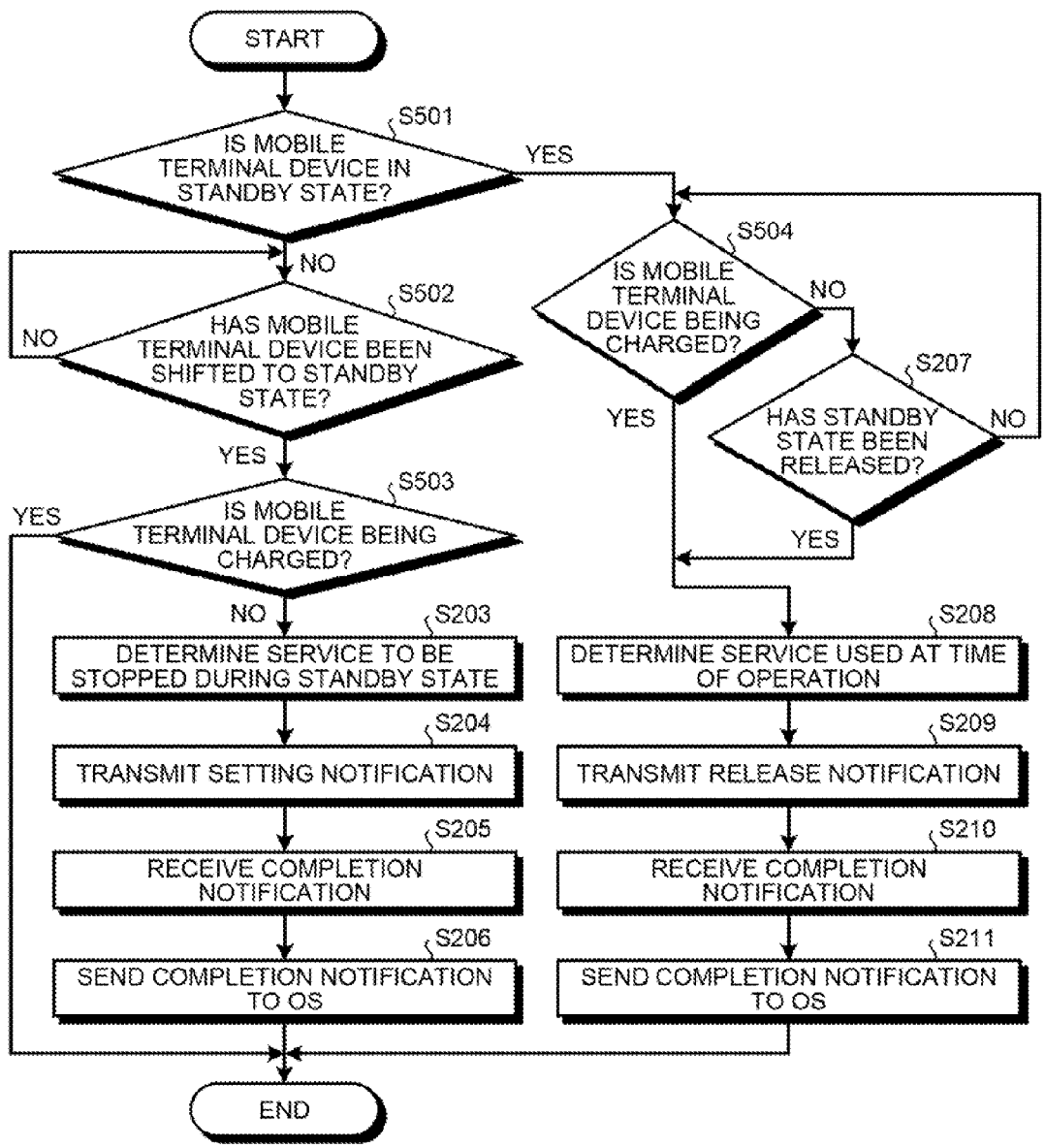

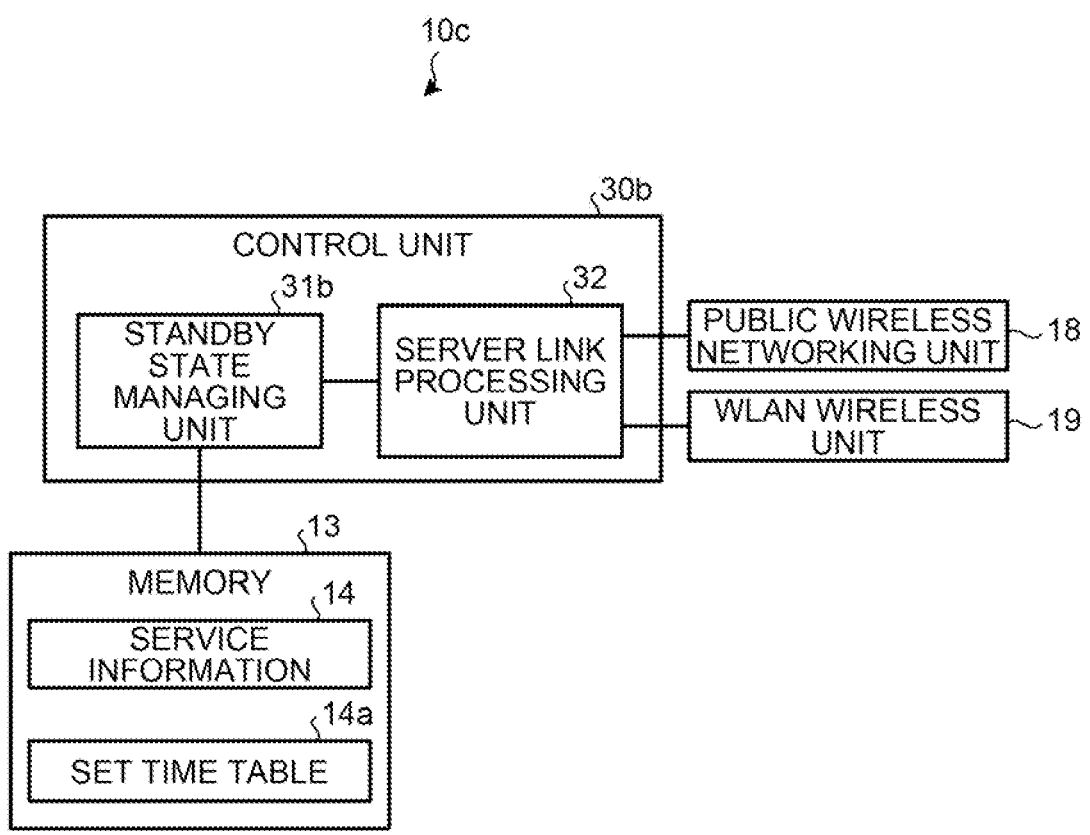

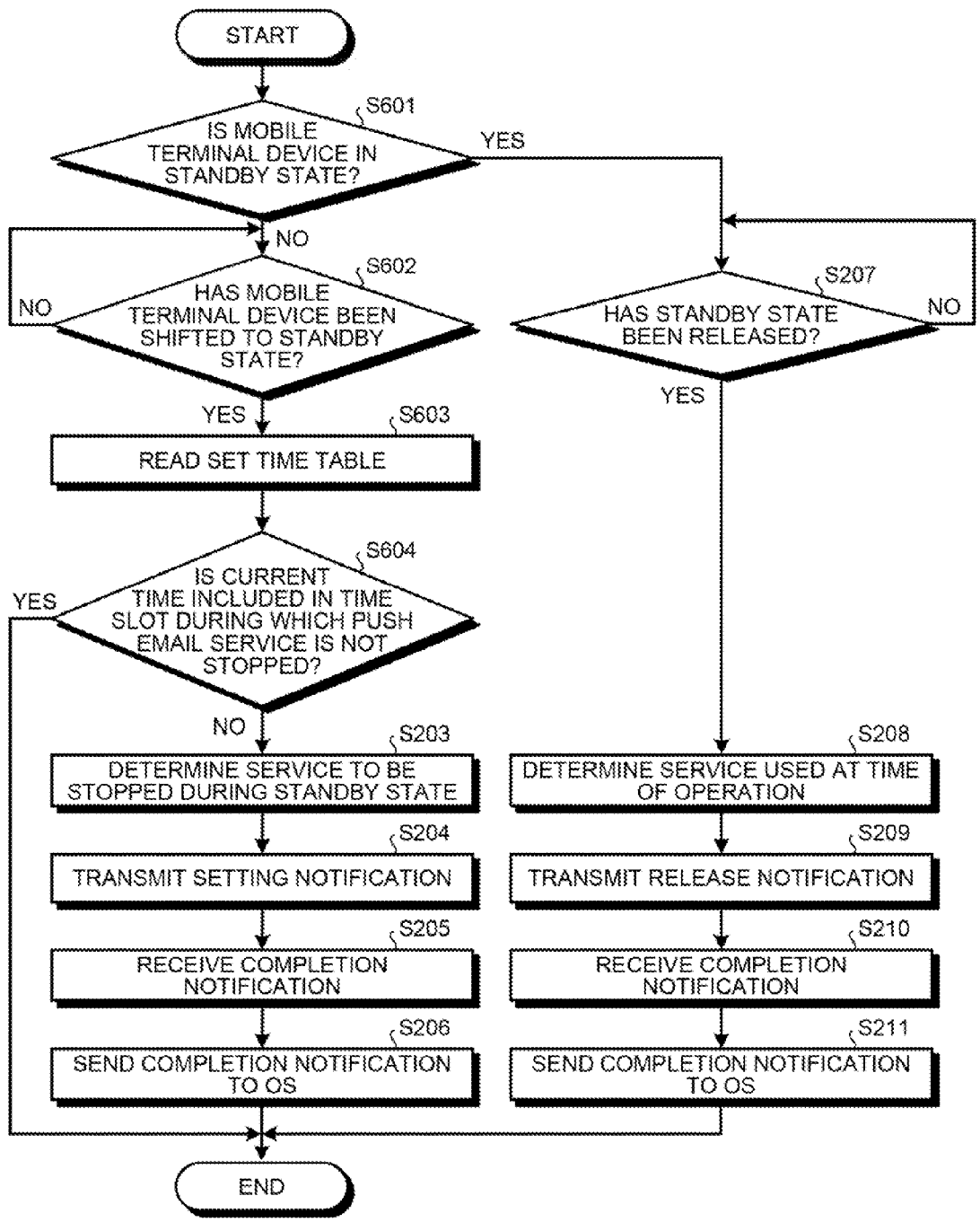

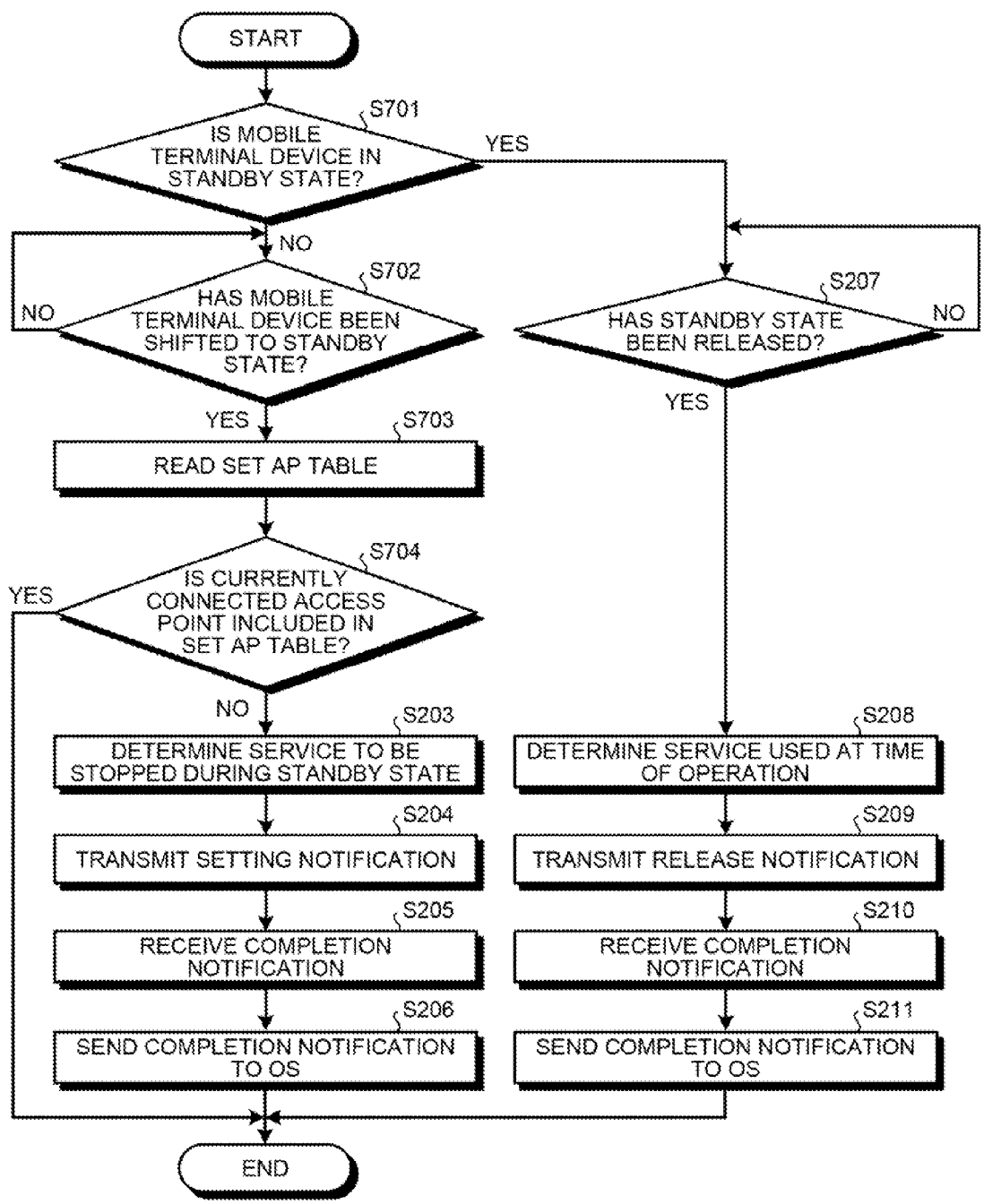

| EMAIL ADDRESS | CONTROL INFORMATION | FREQUENCY INFORMATION |
|---|---|---|
| aaa.111@fj.com | 1 | 1/2 |
| aaa.222@fj.com | 0 | 1/3 |
| aaa.333@fj.com | 2 | 1/3 |
| ... | ... | ... |

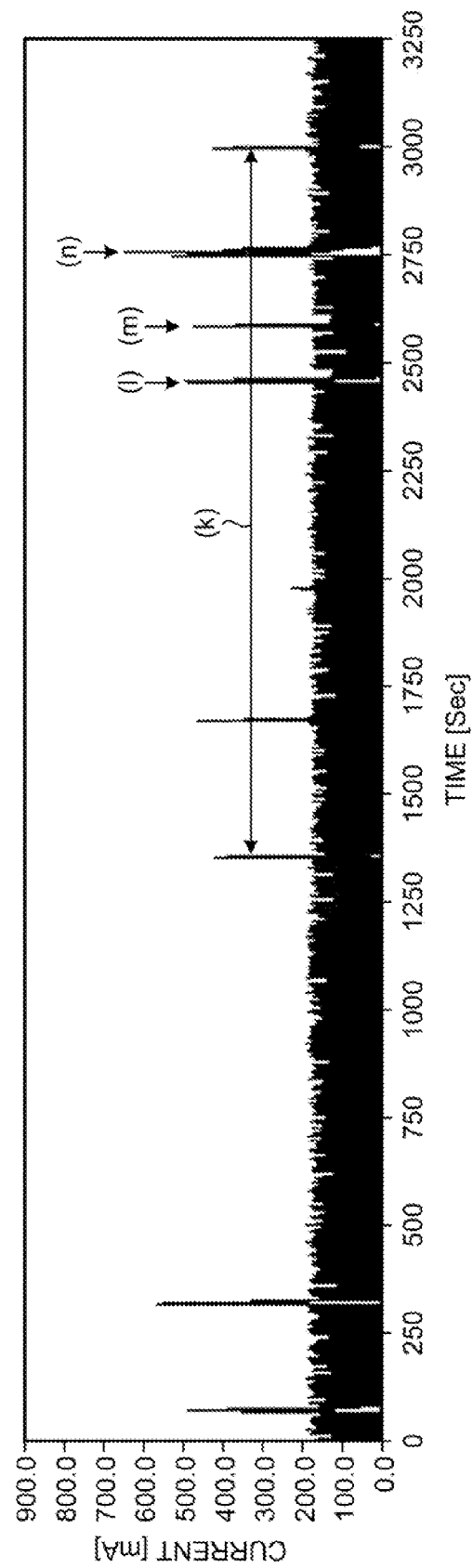

MOBILE TERMINAL DEVICE, COMMUNICATION SYSTEM, COMMUNICATION PROGRAM, AND CONTROL METHOD

CROSS-REFERENCE TO RELATED APPLICATION

This application is based upon and claims the benefit of priority of the prior Japanese Patent Application No. 2011-192047, filed on Sep. 2, 2011, the entire contents of which are incorporated herein by reference.

FIELD

The embodiments discussed herein are directed to a mobile terminal device, a communication system, a communication program, and a control method.

BACKGROUND

A related push-type data delivery service in which servers in networks automatically transmits data to mobile terminal devices is known.

With a server that provides such a push-type data delivery service, if, for example, a calendar or an address book stored in the server is updated, the server automatically transmits, to a mobile terminal device, data used to synchronize the calendar or the address book stored in the mobile terminal device. In such a case, the mobile terminal device passively receives the data transmitted by the server and, by using the received information, updates the calendar or the address book stored in the mobile terminal device.

Furthermore, if the server that provides the push-type data delivery service acquires, for example, an email to be sent to a mobile terminal device, the server transmits the acquired email to the mobile terminal device. In such a case, the mobile terminal device receives the email transmitted from the server and displays the received email.

At this time, if the mobile terminal device transmits and receives data via a 3rd generation mobile telecommunications (3G) network, the mobile terminal device receives its allocated Internet Protocol version 4 (IPv4) address from the server in the 3G network. Furthermore, if the mobile terminal device does not synchronize again with the server in the 3G network within a predetermined time period after the allocated IPv4 address is received, the allocation of the IPv4 address is released in order to prevent IPv4 address exhaustion.

However, if the allocation of the IPv4 address is released, the mobile terminal device does not transmit and receive data via the 3G network; therefore, it is not possible for the mobile terminal device to receive a push-type data delivery service. This is the reason the mobile terminal device has an Always-On function that synchronizes with a server in the 3G network at predetermined time intervals.

Specifically, a mobile terminal device that has an Always-On function synchronizes with the server in the 3G network at predetermined time intervals, and thereby the mobile terminal device retains the allocation of the IPv4 address. Then, the mobile terminal device receives data or an email that is automatically transmitted from the server in the network and then performs various processes.

Patent Document 1: Japanese Laid-open Patent Publication No. 2006-310983
Patent Document 2: Japanese Laid-open Patent Publication No. 2003-134566

However, with the mobile terminal device described above that has the Always-On function, because the mobile terminal device always receives data or an email transmitted from a server that provides the push-type data delivery service, there is a problem in that the amount of electrical power consumed the mobile terminal device increases.

For example, even if the mobile terminal device is in a standby state, the mobile terminal device still synchronizes with the server in the 3G network at a predetermined time intervals in order to retain the allocated IPv4 address; therefore, the amount of electrical power consumption increases. Furthermore, for example, even if the mobile terminal device is in a standby state, the mobile terminal device receives data or an email that is automatically transmitted from a server that provides the push-type data delivery service; therefore, the amount of electrical power consumption increases.

In the following, the amount of electrical power consumed by a mobile terminal device will be described. FIG. 26 is a schematic diagram illustrating an example of the Always-ON function performed by a mobile terminal device. Furthermore, FIG. 26 illustrates an example of a graph indicating the amount of the current that flows in a mobile terminal device that has an Always-On function. Furthermore, in FIG. 26, the vertical axis indicates the amount of the current [mA] flowing in a mobile terminal device, and the horizontal axis indicates the time [Second (Sec)]. Furthermore, in the example illustrated in FIG. 26, it is assumed that the mobile terminal device synchronizes with a server in a network at 28-minute intervals by using the Always-On function.

As illustrated at (h) in FIG. 26, the mobile terminal device performs synchronization with the server in the 3G network using the Always-On function. Furthermore, as illustrated by the arrow (i) in FIG. 26, if the mobile terminal device does not synchronize with the server in the 3G network within the time period of 28 minutes elapsing, the mobile terminal device synchronizes again with the server in the 3G network, as illustrated at (j) in FIG. 26.

FIG. 27 is a schematic diagram illustrating an example of the amount of electrical power consumed when a mobile terminal device synchronizes with a server in a 3G network. In the example illustrated in FIG. 27, similarly to the example illustrated in FIG. 26, the vertical axis indicates the amount of the current [mA] flowing in the mobile terminal device, and the horizontal axis indicates the time [Sec]. For example, in the example illustrated in FIG. 27, the mobile terminal device synchronizes with the server in the 3G network after 10 seconds have elapsed since the time measurement started. An average of 222.24 [mA] flows in the mobile terminal device for 10.63 seconds.

At this time, if the Always-On function is performed, the average current flowing in the mobile terminal device becomes 5.29 [mA]. In contrast, if the Always-On function is not performed, the average current flowing in the mobile terminal device becomes 3.28 [mA]. In this way, if the mobile terminal device performs the Always-On function, the electrical power consumption increases.

In the following, a description will be given of a case in which, electrical power consumption increases due to the mobile terminal device passively receiving an email or data when the mobile terminal device is in a standby state. FIG. 28 is a schematic diagram illustrating an example of the amount of electrical power consumed when a mobile terminal device is in a standby state. In the example illustrated in FIG. 28, the vertical axis indicates the amount of current [mA] flowing in the mobile terminal device when it is in the standby state, and the horizontal axis indicates the time [Sec].

In the example illustrated in FIG. 28, as illustrated by the arrow (k) in FIG. 28, because the mobile terminal device has not synchronized with the server in the 3G network for 27.2 minutes, the mobile terminal device automatically synchronizes with the server in the 3G network by using the Always-On function. Furthermore, in the example illustrated in FIG. 28, the mobile terminal device receives, using the push-type data delivery service, data that is used to perform synchronization of calendars that is performed at the time indicated by (l) and (m) in FIG. 28 and receives an email at the time indicated by (n). Specifically, because, in addition to the electrical power consumption due to the Always-On function, the mobile terminal device also consumes electrical power when it receives data related to the push-type data delivery service when the mobile terminal device is in a standby state; therefore, the electrical power consumption increases.

According to an aspect of the present invention, the technology disclosed in the present invention reduces the electrical power consumed by a mobile terminal device.

SUMMARY

According to an aspect of embodiments, a mobile terminal device that receives information related to a push email service from a server that provides the push email service via a wireless communication network, the mobile terminal device includes a storing unit that stores therein setting information indicating whether the information related to the push email service is received when the mobile terminal device is in a standby state; a determining unit that determines whether the state of the mobile terminal device will be shifted to the standby state; and a transmitting unit that transmits, to the server that provides the push email service when the determining unit determines that the state of the mobile terminal device will be shifted to the standby state, a setting notification that instructs stopping of the push email service on the basis of the setting information stored by the storing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A is a schematic diagram illustrating an example of a mail server according to the first embodiment;

FIG. 5B is a schematic diagram illustrating an example of a synchronization control association table according to the first embodiment;

FIG. 19 is a schematic diagram illustrating an example of a mobile terminal device that transmits a release notification when charging is started in a standby state;

FIG. 20A is a schematic diagram illustrating an example of a mobile terminal device that determines whether a push email service is stopped in accordance with a time slot;

FIG. 20B is a flowchart illustrating an example of a process performed by the mobile terminal device that determines whether the push email service is stopped in accordance with the time slot;

FIG. 21B is a flowchart illustrating an example of a process performed by the mobile terminal device that determines whether the push email service is provided in accordance with an access point;

FIG. 28 is a schematic diagram illustrating an example of the amount of electrical power consumed when a mobile terminal device is in a standby state.

DESCRIPTION OF EMBODIMENTS

Preferred embodiments will be explained with reference to accompanying drawings.

The mobile terminal device, the communication system, the communication program, and the control method according to the present invention are not limited to the embodiments described below. In particular, any terminal device, such as a mobile phone or a PDA, that performs wireless communication is used for the mobile terminal device.

[a] First Embodiment

Figure 1:
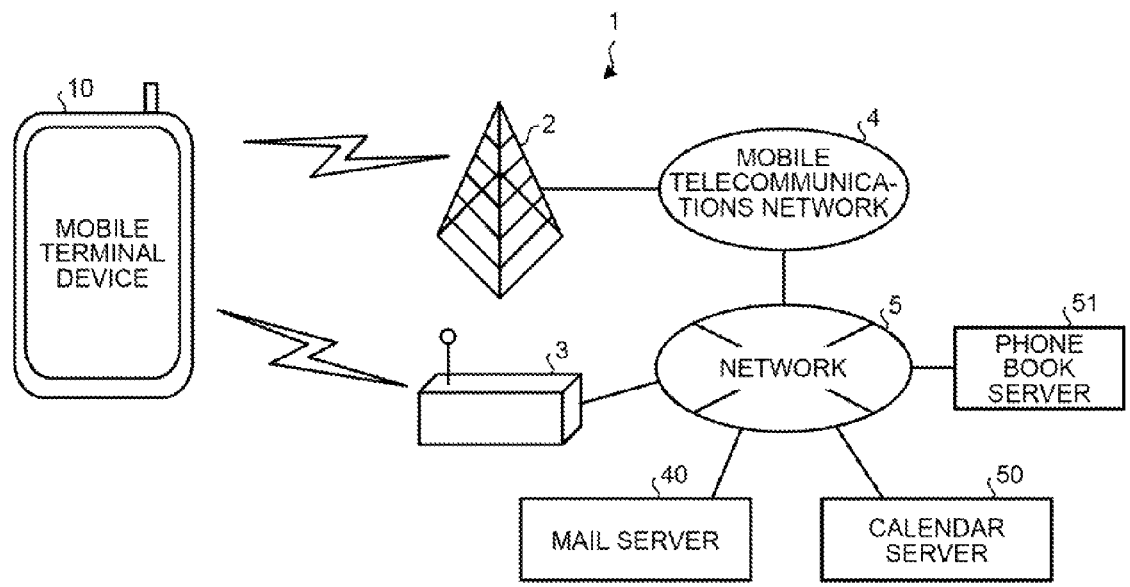
FIG. 1 is a schematic diagram illustrating an example of a communication system according to a first embodiment.

In a first embodiment, an example of the communication system will be described using FIG. 1. FIG. 1 is a schematic diagram illustrating an example of a communication system according to the first embodiment.

As illustrated in FIG. 1, a communication system 1 includes a base station 2, an access point 3, a mobile telecommunications network 4, a network 5, a mobile terminal device 10, a mail server 40, a calendar server 50, and a phone book server 51. Although not illustrated in the example illustrated in FIG. 1, it is assumed that the communication system 1 includes multiple mobile terminal devices that are the same as the mobile terminal device 10.

The base station 2 is a base station that is used by, for example, the mobile terminal device 10 to connect to the mobile telecommunications network 4 and the network 5 via the 3rd generation mobile telecommunications (3G) network. Furthermore, the access point 3 is an access point that is used by, for example, the mobile terminal device 10 to connect to the network 5 via a wireless local area network (WLAN).

The mobile terminal device 10 is a mobile terminal device that receives a push-type data delivery service via the network 5. For example, by using a push-type email delivery service provided by the mail server 40, the mobile terminal device 10 passively receives an email that is automatically transmitted by the mail server 40. Then, if the mobile terminal device 10 receives an email from the mail server 40, the mobile terminal device 10 performs a processes for, for example, displaying the received email.

Furthermore, by using the push-type data delivery service provided by the calendar server 50, the mobile terminal device 10 passively receives, from the calendar server 50, data that is used to synchronize the data on the calendar stored in the calendar server 50 with the data on the calendar stored in the mobile terminal device 10. Then, by using the received data, the mobile terminal device 10 synchronizes the data on the calendar stored in the mobile terminal device 10 with the data on the calendar stored in the calendar server 50.

Furthermore, by using the push-type data delivery service provided by the phone book server 51, the mobile terminal device 10 passively receives, from the phone book server 51, data for synchronizing data on the phone book stored in the phone book server 51 with data on the phone book stored in the mobile terminal device 10. Then, by using the received data, the mobile terminal device 10 synchronizes the data on the phone book stored in the mobile terminal device 10 with the data on the phone book stored in the phone book server 51.

Furthermore, the mobile terminal device 10 stores therein service information that indicates whether an email will be received from the mail server 40 when the mobile terminal device 10 is in a standby state. Furthermore, the mobile terminal device 10 stores therein service information that indicates whether data for synchronizing the calendar will be received from the calendar server 50 when the mobile terminal device 10 is in a standby state. Furthermore, the mobile terminal device 10 determines whether the state of the mobile terminal device 10 is shifted to a standby state. If the mobile terminal device 10 determines to shift its state to a standby state, the mobile terminal device 10 performs the following process. Namely, on the basis of the service information, the mobile terminal device 10 determines whether information on a push email service is transmitted to the mail server 40 and the calendar server 50.

For example, if the mobile terminal device 10 stores therein service information, which indicates that only email is received and data for synchronizing the calendar is not received from the calendar server 50 when the mobile terminal device 10 is in a standby state, the mobile terminal device 10 performs the following process when the mobile terminal device 10 shifts to a standby state. Namely, the mobile terminal device 10 transmits, to the calendar server 50, a setting notification indicating that a data delivery service for the calendar synchronization is stopped.

Furthermore, if the mobile terminal device 10 is in a standby state, the mobile terminal device 10 determines whether the mobile terminal device 10 will release the standby state. If the mobile terminal device 10 determines that it will release the standby state, the mobile terminal device 10 transmits, to the calendar server 50, a release notification indicating that the stopping of the data delivery service is released.

Furthermore, for example, if the mobile terminal device 10 stores therein service information indicating that only the data for synchronizing the calendar is received when it is in a standby state, the mobile terminal device 10 transmits, to the mail server 40 when the mobile terminal device 10 shifts to a standby state, the setting notification indicating that an email delivery service is stopped. Then, if the mobile terminal device 10 releases the standby state, the mobile terminal device 10 transmits, to the mail server 40, the release notification indicating that the stopping of the email delivery service is released.

In this way, if the mobile terminal device 10 shifts to a standby state, on the basis of the service information, the mobile terminal device 10 sets a server that provides the push email service. Accordingly, the mobile terminal device 10 reduces the number of times the push email service is provided when it is in a standby state; therefore, the amount of electrical power consumption can be reduced.

Figure 2:
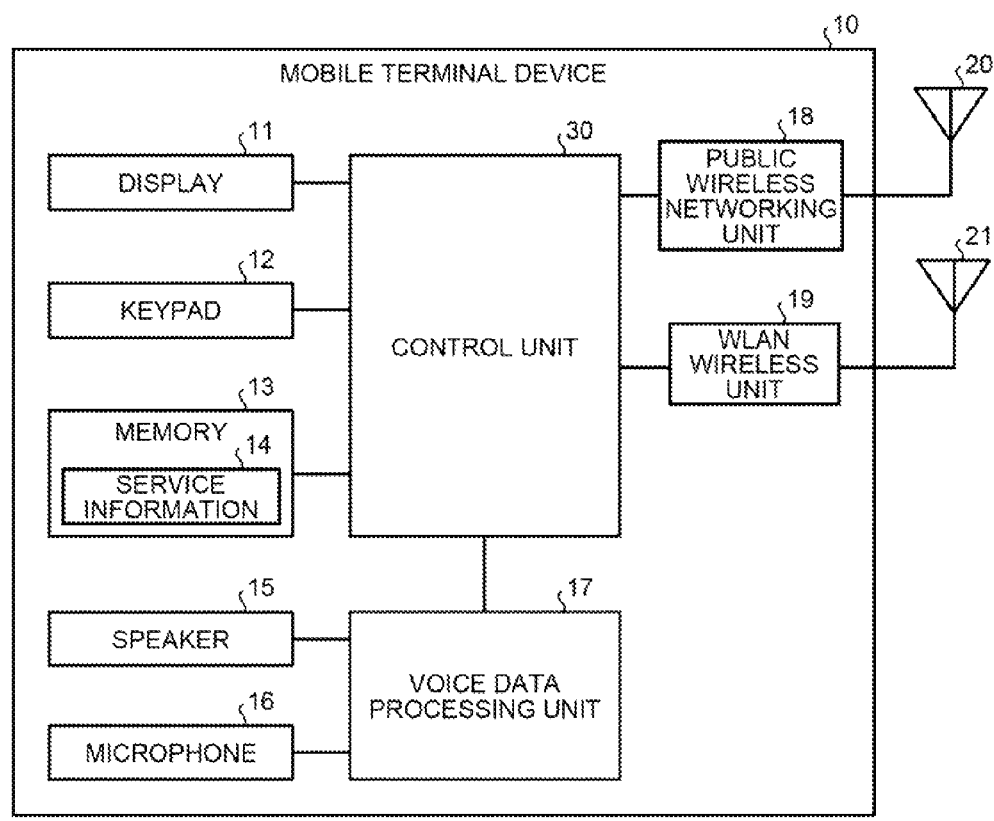
FIG. 2 is a schematic diagram illustrating an example of a mobile terminal device according to the first embodiment.

In the following, a specific example of the mobile terminal device 10 will be described. FIG. 2 is a schematic diagram illustrating an example of a mobile terminal device according to the first embodiment. In the example illustrated in FIG. 2, the mobile terminal device 10 includes a display 11, a keypad 12, a memory 13, a speaker 15, a microphone 16, a voice data processing unit 17, a public wireless networking unit 18, a WLAN wireless unit 19, an antenna 20, an antenna 21, and a control unit 30. The memory 13 stores therein service information 14.

The display 11 is a display that displays an email received by the mobile terminal device 10 and a calendar stored in the mobile terminal device 10. The keypad 12 is an input device that is used by a user of the mobile terminal device 10 when the user inputs an email or operates the mobile terminal device 10. The memory 13 is a storage device that stores therein data used for various processes performed by the mobile terminal device 10. Furthermore, the memory 13 stores therein the service information 14 indicating whether an email or data related to the push email service is received when the mobile terminal device 10 is in a standby state.

Figures 3, 4:
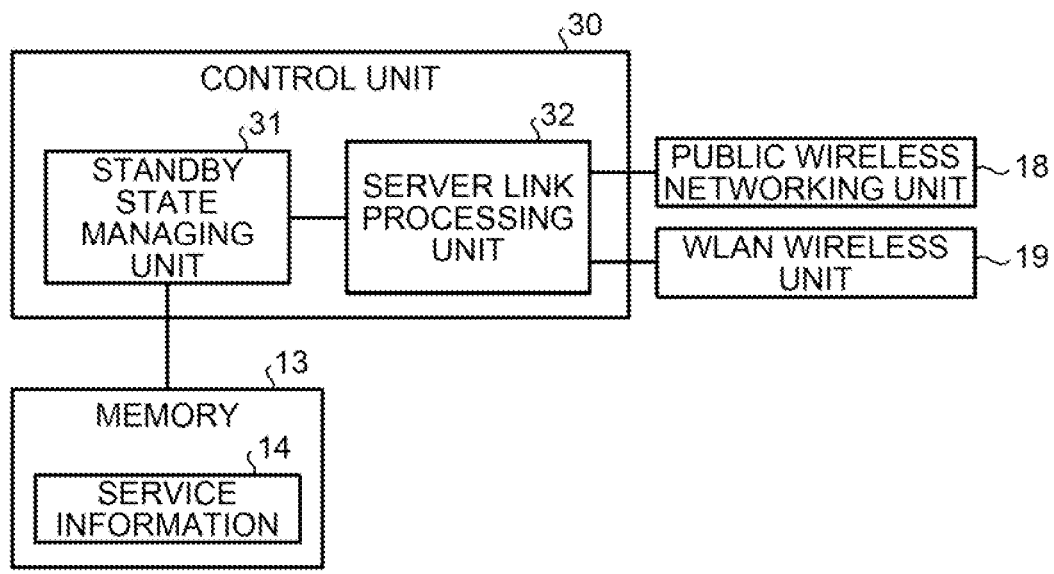
FIG. 3 is a schematic diagram illustrating an example of service information according to the first embodiment.
FIG. 4 is a schematic diagram illustrating an example of a control unit according to the first embodiment.

In the following, an example of the service information 14 will be described. FIG. 3 is a schematic diagram illustrating an example of service information according to the first embodiment. In the example illustrated in FIG. 3, the service information 14 is information containing, in an associated manner, a service name, which indicates the push email service provided to the mobile terminal device 10, and flag information, which indicates whether data on services or an email is received when the mobile terminal device 10 is in a standby state.

For example, in the example illustrated in FIG. 3, the service name "email W" and the flag "1" are associated with each other and are stored as the service information 14. Furthermore, in the example illustrated in FIG. 3, the service names "phone book", the "calendar", the "service X", the "service Y", and the "service Z" are each associated with the flag "0" and are stored as the service information 14.

In this case, the "email W" indicates the push-type email delivery service provided by the mail server 40. The "calendar" is the push-type data delivery service provided by the calendar server 50 and indicates a service that delivers data for synchronizing the calendar stored in the calendar server 50 with the calendar stored in the mobile terminal device 10. The "phone book" is the push-type data delivery service provided by the phone book server 51 and indicates a service that delivers data for synchronizing the phone book stored in the phone book server 51 with the phone book stored in the mobile terminal device 10.

If the mobile terminal device 10 is in a standby state, the flag "1" indicates that information on a related service is received. Specifically, in the example illustrated in FIG. 3, the service information 14 indicates that, if the mobile terminal device 10 is in a standby state, only the email related to the "email W" is received and data related to another push-type data delivery service is not received.

A description will be given here by referring back to FIG. 2. The speaker 15 is a playback device for playing back the sound from the other party when the mobile terminal device 10 performs voice communication with another terminal. The microphone 16 is an input device that inputs sound to be transmitted to the other party when the mobile terminal device 10 performs voice communication with another terminal. The voice data processing unit 17 performs a process for playing back, in the speaker 15, voice data received when the mobile terminal device 10 performs voice communication. Furthermore, the voice data processing unit 17 converts the sound input by the microphone 16 to voice data that is transmitted to the other party.

The public wireless networking unit 18 transmits and receives a radio signal via the antenna 20. Specifically, the public wireless networking unit 18 connects to a 3G network via the base station 2 and the mobile telecommunications network 4. Furthermore, the public wireless networking unit 18 transmits and receives an email and data to/from the mail server 40 and the calendar server 50 via the network 5. For example, the public wireless networking unit 18 performs, on the signal received from the antenna 20, a radio process, such as analog to digital (A/D) conversion and transmits the signal subjected to the radio process to the control unit 30. Furthermore, for example, the public wireless networking unit 18 performs, on the signal received from the control unit 30, the radio process, such as analog to digital (A/D) conversion and transmits the signal subjected to the radio process to the base station 2 via the antenna 20.

The WLAN wireless unit 19 transmits and receives a radio signal via the antenna 21. Specifically, the WLAN wireless unit 19 transmits and receives a radio signal to/from the access point 3 by using a WLAN and transmits and receives an email and data to/from the mail server 40 and the calendar server 50 via the network 5.

The antenna 20 is an antenna that is used to perform wireless communication between the mobile terminal device 10 and the base station 2. The antenna 21 is an antenna that is used to perform wireless communication between the mobile terminal device 10 and the access point 3.

The control unit 30 controls the display 11, the keypad 12, the memory 13, the speaker 15, the microphone 16, the voice data processing unit 17, the public wireless networking unit 18, and the WLAN wireless unit 19 in the mobile terminal device 10. For example, the control unit 30 includes a central processing unit (CPU) and executes programs for controlling functions included in the display 11, the keypad 12, the memory 13, the speaker 15, the microphone 16, and the voice data processing unit 17. Furthermore, for example, the control unit 30 executes programs for controlling functions included in the public wireless networking unit 18 and the WLAN wireless unit 19.

Furthermore, the control unit 30 connects to the 3G network by controlling the public wireless networking unit 18 and the antenna 20 and transmits and receives data to/from the mail server 40 or the calendar server 50 via the base station 2, the mobile telecommunications network 4, and the network 5. Furthermore, the control unit 30 connects to the access point 3 by controlling the WLAN wireless unit 19 and the antenna 21 and transmits and receives data to/from the mail server 40 or the calendar server 50 via the network 5.

Specifically, the control unit 30 acquires, via the 3G network or the WLAN, an email transmitted by using the push-type data delivery service provided by the mail server 40. Then, the control unit 30 performs a process for, for example, displaying the received email on the display 11. Furthermore, the control unit 30 receives, via the 3G network or the WLAN, data transmitted by using the push-type data delivery service provided by the calendar server 50. Then, by using the received data, the control unit 30 synchronizes the calendar stored in the mobile terminal device 10 with the calendar stored in the calendar server 50.

Furthermore, the control unit 30 determines whether the state of the mobile terminal device 10 will be shifted to a standby state. If the control unit 30 determines that the state of the mobile terminal device 10 will be shifted to a standby state, the control unit 30 performs the following process. Namely, the control unit 30 refers to the service information 14 stored in the memory 13 and determines to perform the push email service that stops the data delivery when the mobile terminal device 10 is in a standby state. Then, the control unit 30 transmits, to a server that provides the determined push email service, a setting notification that instructs the stopping of the delivery of data.

Furthermore, if the mobile terminal device 10 is in a standby state, the control unit 30 determines whether to release the standby state. Then, if the control unit 30 determines that it will release the standby state, the control unit 30 transmits, to the server that transmits the setting notification, the release notification indicating the resumption of the push email service.

In the following, an example of the control unit 30 will be described. FIG. 4 is a schematic diagram illustrating an example of a control unit according to the first embodiment. In the example illustrated in FIG. 4, by executing programs, the control unit 30 operates as a standby state managing unit 31 and a server link processing unit 32. In the following description, it is assumed that an operating system (OS) in the mobile terminal device 10 performs a signal process or a display process when an email is received and performs a signal process or a synchronization process on calendars when data for synchronizing calendars is received, and a description thereof will be omitted where appropriate.

The standby state managing unit 31 determines whether the state of the mobile terminal device 10 will be shifted to a standby state. If the standby state managing unit 31 determines that the state of the mobile terminal device 10 will be shifted to a standby state, the standby state managing unit 31 shifts the state of the mobile terminal device 10 to a standby state and performs the following process.

Namely, the standby state managing unit 31 refers to the service information 14 stored in the memory 13. Then, the standby state managing unit 31 identifies a push email service that stops the data delivery when the mobile terminal device 10 is in a standby state. Then, the standby state managing unit 31 transmits, to the server link processing unit 32, a notification indicating the identified service and the setting notification that instructs the stopping of the push email service.

Furthermore, if the mobile terminal device 10 is in a standby state, the standby state managing unit 31 determines whether to release the standby state. If the standby state managing unit 31 determines that it will release the standby state, the standby state managing unit 31 releases the standby state of the mobile terminal device 10 and performs the following process. Namely, the standby state managing unit 31 refers to the service information 14 and identifies a push email service that stops the data delivery during the standby state. Then, the standby state managing unit 31 transmits, to the server link processing unit 32, a notification indicating the identified service and a release notification indicating the resumption of the push email service.

For example, if the standby state managing unit 31 determines that it will shift the state of the mobile terminal device 10 to a standby state, the standby state managing unit 31 refers to the service information 14 stored in the memory 13. In the example illustrated in FIG. 3, in the service information 14, the service name "email W" is associated with the flag "1"; the service name "calendar" is associated with the flag "0"; and the service name "phone book" is associated with the flag "0".

Accordingly, if the mobile terminal device 10 is in a standby state, the standby state managing unit 31 identifies that the mobile terminal device 10 only receives data on the service "email W", i.e., receives only emails and decides to stop the delivery of data related to the service "calendar" and the service "phone book". Then, the standby state managing unit 31 transmits, to the server link processing unit 32, both the notification indicating the service "calendar" and the service "phone book" and the setting notification that instructs the stopping of the push email service.

Furthermore, if the standby state managing unit 31 determines that it will release the standby state, the standby state managing unit 31 again refers to the service information 14 stored in the memory 13. Then, the standby state managing unit 31 identifies the "calendar" and the "phone book", which are the services provided by the server that transmits the setting notification, i.e., the services that stop the data delivery when the mobile terminal device 10 is in a standby state. Then, the standby state managing unit 31 transmits, to the server link processing unit 32, both the notification indicating the identified service "calendar" and the identified service "phone book" and the release notification indicating the resumption of the push email service.

The standby state managing unit 31 can set an arbitrary trigger as a trigger that shifts the state of the mobile terminal device 10 to a standby state. For example, the standby state managing unit 31 determines that it will shift the state of the mobile terminal device 10 to the standby state if the mobile terminal device 10 is not operated for a predetermined time period or if an input of an instruction indicating that a user will shift the state of the mobile terminal device 10 to a standby state is received. Then, the standby state managing unit 31 controls the operation of the units 11 to 19 included in the mobile terminal device 10 and shifts the state of the mobile terminal device 10 to the standby state.

Furthermore, the standby state managing unit 31 can set an arbitrary trigger as a trigger that releases the standby state of the mobile terminal device 10. For example, the standby state managing unit 31 determines that it will release the standby state of the mobile terminal device 10 if an input is received via the keypad 12 or if an incoming call is received when the mobile terminal device 10 is in the standby state. Then, the standby state managing unit 31 controls the units 11 to 19 included in the mobile terminal device 10 and releases the standby state of the mobile terminal device 10.

If the standby state managing unit 31 determines that it will shift the state of the mobile terminal device 10 to a standby state, the server link processing unit 32 performs the following process. Namely, the server link processing unit 32 transmits, to a server that provides the push email service that stops the data delivery when the mobile terminal device 10 is in a standby state, the setting notification that instructs the stopping of the push email service.

Furthermore, if the standby state managing unit 31 determines that it will release the standby state when the mobile terminal device 10 is in a standby state, the server link processing unit 32 performs the following process. Namely, the server link processing unit 32 transmits, to the server that transmits the setting notification, the release notification indicating the resumption of the push email service.

For example, the server link processing unit 32 receives the notification, which indicates the services "calendar" and "phone book", and the setting notification. In such a case, the server link processing unit 32 determines the calendar server 50 that provides the service "calendar" and determines the phone book server 51 that provides the service "phone book". Then, the server link processing unit 32 transmits the setting notification to both the determined calendar server 50 and the determined phone book server 51.

Furthermore, the server link processing unit 32 receives both the notification indicating the services "calendar" and "phone book" and the release notification. In such a case, the server link processing unit 32 determines the calendar server 50 that provides the service "calendar" and the phone book server 51 that provides the service "phone book" and transmits the release notification to both the determined calendar server 50 and the determined phone book server 51.

Furthermore, the server link processing unit 32 can determine the server that provides the service by using an arbitrary method. For example, servers that provide the push email service for the mobile terminal device 10 and service names provided by the server may be previously stored in an associated manner and the server link processing unit 32 may also determine a server that is associated with the service name notified by the standby state managing unit 31.

Furthermore, the server link processing unit 32 can transmit the setting notification and the release notification by using an arbitrary route. For example, the server link processing unit 32 can transmit the setting notification and the release notification by using a 3G network or a WLAN.

A description will be given here by referring back to FIG. 1. The mail server 40 is a server that provides the push-type email delivery service for the mobile terminal device 10. For example, if the mail server 40 acquires an email whose destination is the mobile terminal device 10, the mail server 40 automatically transmits the acquired email to the mobile terminal device 10 via the network 5.

Furthermore, if the mail server 40 receives a setting notification indicating that the email delivery service is stopped from the mobile terminal device 10, the mail server 40 stops the email delivery service provided for the mobile terminal device 10. If the mail server 40 receives a release notification indicating that the stopped email delivery service is released from the mobile terminal device 10, the mail server 40 resumes the email delivery service and transmits, to the mobile terminal device 10, an email retained during the time period in which the email delivery service was stopped.

In the following, an example of the mail server 40 will be described with reference to the drawings. FIG. 5A is a schematic diagram illustrating an example of a mail server according to the first embodiment. In the example illustrated in FIG. 5A, the mail server 40 includes a control table storing unit 41, a mail storing unit 43, a control unit 44, a network control unit 45, a display 46, and a keyboard 47. It is assumed that the display 46 has the same function as that performed by the display 11 illustrated in FIG. 2, and the keyboard 47 has the same function as that performed by the keypad 12 illustrated in FIG. 2; therefore, descriptions thereof will be omitted.

The control table storing unit 41 stores therein a synchronization control association table 42 that indicates whether the push-type email delivery service is provided for the mobile terminal device 10. The synchronization control association table 42 contains information in which email addresses of the mobile terminal devices that provide the push-type email delivery service are associated with control information indicating whether email delivery is performed.

FIG. 5B is a schematic diagram illustrating an example of a synchronization control association table according to the first embodiment. In the example illustrated in FIG. 5B, the email address "aaa.111@fj.com" is associated with the control information "1". Furthermore, the email address "aaa.222@fj.com" is associated with the control information "0", and the email address "aaa.333.@fj.com" is associated with the control information "1".

In the example illustrated in FIG. 5B, the control information "1" is information indicating that the email delivery is performed, whereas the control information "0" is information indicating that the email delivery is not performed. In the example illustrated in FIG. 5B, the mail server 40 provides the push-type email delivery service for the mobile terminal devices whose respective email addresses are "aaa.111@fj.com" and "aaa.333@fj.com".

Furthermore, the mail server 40 does not provide the push-type email delivery service for the mobile terminal device whose email address is "aaa.222@fj.com". Specifically, the mail server 40 stops the push-type email delivery service for the mobile terminal device whose email address is "aaa.222@fj.com".

A description will be given here by referring back to FIG. 5A. The mail storing unit 43 is a storage device that stores therein emails to be transmitted to mobile terminal devices. The control unit 44 transmits the emails stored in the mail storing unit 43 to mobile terminal devices. Specifically, the control unit 44 identifies an email address corresponding to the destination of an email stored in the mail storing unit 43. Then, the control unit 44 refers to the synchronization control association table 42 stored in the control table storing unit 41 and determines whether control information associated with the email address that corresponds to the identified destination is "1" or "0".

If the control information associated with the email address that corresponds to the identified destination is "1", the control unit 44 acquires an email stored in the mail storing unit 43 and transfers the email to the network control unit 45. In contrast, if the control information associated with the email address that corresponds to the identified destination is "0", the control unit 44 ends the process without transferring the email.

Furthermore, if the control unit 44 receives the setting notification from the mobile terminal device 10 via the network 5 and the network control unit 45, the control unit 44 sets the control information associated with the email address of the mobile terminal device 10 to "0". Furthermore, if the control unit 44 receives the release notification from the mobile terminal device 10 via the network 5 and the network control unit 45, the control unit 44 sets the control information associated with the email address of the mobile terminal device 10 to "1".

Specifically, if the control unit 44 receives the setting notification from the mobile terminal device 10, the control unit 44 stops the push-type email delivery service provided for the mobile terminal device 10. Furthermore, if the control unit 44 receives the release notification from the mobile terminal device 10, the control unit 44 resumes the push-type email delivery service provided for the mobile terminal device 10.

If the network control unit 45 receives an email to be sent to the mobile terminal device 10 via the network 5, the network control unit 45 stores the received email in the mail storing unit 43. Furthermore, if the network control unit 45 receives an email from the control unit 44, the network control unit 45 transmits the received email to the mobile terminal device 10 via the network 5. Furthermore, if the network control unit 45 receives the setting notification or the release notification from the mobile terminal device 10 via the network 5, the network control unit 45 transfers the received setting notification or the release notification to the control unit 44.

A description will be given here by referring back to FIG. 1. The calendar server 50 stores therein, for each mobile terminal device, a calendar of each mobile terminal device included in the communication system 1. If a calendar related to the mobile terminal device 10 is updated from among the calendars stored in the calendar server 50, the calendar server 50 creates data for synchronizing the calendar stored in the mobile terminal device 10 with the calendar stored in the calendar server 50. Then, the calendar server 50 transmits the created data to the mobile terminal device 10.

Furthermore, if the calendar server 50 receives the setting notification from the mobile terminal device 10, similarly to the mail server 40, the calendar server 50 stops the push-type data delivery service provided for the mobile terminal device 10. Furthermore, if the calendar server 50 receives the release notification from the mobile terminal device 10, similarly to the mail server 40, the calendar server 50 resumes the push-type data delivery service provided for the mobile terminal device 10.

Figure 6A:
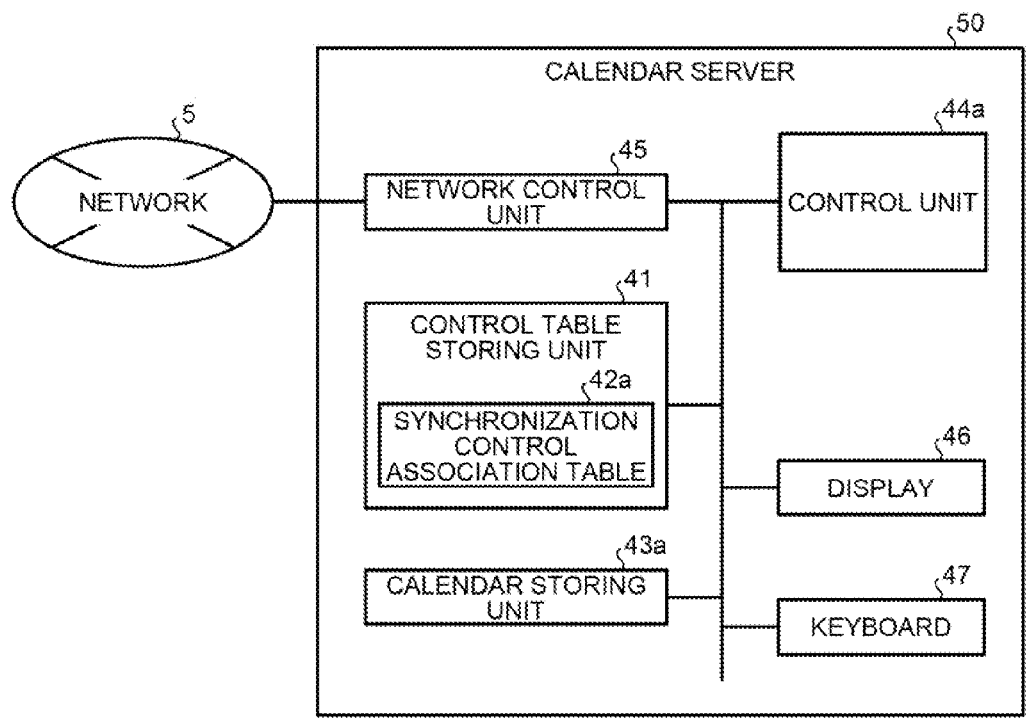
FIG. 6A is a schematic diagram illustrating an example of a calendar server according to the first embodiment.

In the following, an example of the calendar server 50 will be described with reference to FIG. 6A. FIG. 6A is a schematic diagram illustrating an example of a calendar server according to the first embodiment. It is assumed that the control table storing unit 41, the network control unit 45, and the display 46 illustrated in FIG. 6A have the same functions as those performed by the control table storing unit 41, the network control unit 45, and the display 46, respectively, illustrated in FIG. 5A; therefore, descriptions thereof will be omitted. Furthermore, it is assumed that the keyboard 47 illustrated in FIG. 6A has the same function as that performed by the keyboard 47 illustrated in FIG. 5A; therefore, a description thereof will be omitted.

Similarly to the synchronization control association table 42, a synchronization control association table 42a contains information indicating whether the push-type data delivery service is provided for the mobile terminal device 10. Specifically, the synchronization control association table 42a contains information indicating, for each mobile terminal device, whether data for synchronizing the calendar stored in the calendar server 50 with the calendar stored in each mobile terminal device will be delivered.

For example, the synchronization control association table 42a stores therein, in an associated manner, an account of each mobile terminal device and a flag indicating whether data is delivered to each mobile terminal device. The account of each mobile terminal device mentioned here is an identifier of each mobile terminal device and is, for example, an email address of each mobile terminal device.

A calendar storing unit 43a stores therein data on a calendar for each mobile terminal device included in the communication system 1. For example, the calendar storing unit 43a stores therein, in an associated manner, an account of each mobile terminal device and data on a calendar for each mobile terminal device.

A control unit 44a performs the same process as that performed by the control unit 44. For example, if a user updates the calendar stored in the calendar storing unit 43a by using a terminal other than a mobile terminal device, such as a personal computer (PC), the control unit 44a performs the following process. Namely, the control unit 44a creates data for updating the data on the calendar that has not been updated to the data on an updated calendar. Furthermore, the control unit 44a identifies an account associated with data on an updated calendar. Furthermore, the control unit 44a refers to the synchronization control association table 42a stored in the control table storing unit 41 and refers to a flag that is stored in the synchronization control association table 42a and that is associated with the identified account.

If the flag that is referred to indicates that the data delivery is performed, the control unit 44a transmits, to the network control unit 45, data for updating the calendar and allows the data to be transmitted to the mobile terminal device indicated by the identified account. In contrast, if the flag that is referred to indicates that data delivery is not performed, the control unit 44a ends the process without transmitting the data for updating the calendar.

Furthermore, if the control unit 44a receives the setting notification from the mobile terminal device 10, similarly to the control unit 44, the control unit 44a refers to the synchronization control association table 42a and updates the flag associated with the account of the mobile terminal device 10 to a flag indicating that data delivery is not performed. Furthermore, if the control unit 44a receives the release notification from the mobile terminal device 10, the control unit 44a refers to the synchronization control association table 42a and updates the flag associated with the account of the mobile terminal device 10 to a flag indicating that the data delivery is performed.

A description will be given here by referring back to FIG. 1. The phone book server 51 stores therein, for each mobile terminal device, data on a phone book of each mobile terminal device included in the communication system 1. If the data on the phone book related to the mobile terminal device 10 stored in the phone book server 51 is updated, the phone book server 51 creates data for synchronizing data on the updated phone book with the data on the phone book stored in the mobile terminal device 10. Then, the phone book server 51 transmits the created data to the mobile terminal device 10.

If the phone book server 51 receives the setting notification from the mobile terminal device 10, similarly to the mail server 40 and the calendar server 50, the phone book server 51 stops the push-type data delivery service provided for the mobile terminal device 10. Furthermore, if the phone book server 51 receives the release notification from the mobile terminal device 10, the phone book server 51 resumes the push-type data delivery service provided for the mobile terminal device 10.

Specifically, if the phone book server 51 receives the setting notification from the mobile terminal device 10, the phone book server 51 does not transmit, to the mobile terminal device 10, the data for synchronizing the phone books even if the phone book in the mobile terminal device 10 stored in the phone book server 51 has been updated. If the phone book server 51 receives the release notification from the mobile terminal device 10, the phone book server 51 resumes the push-type data delivery service and transmits the data for synchronizing the phone books to the mobile terminal device 10.

Figure 6B:
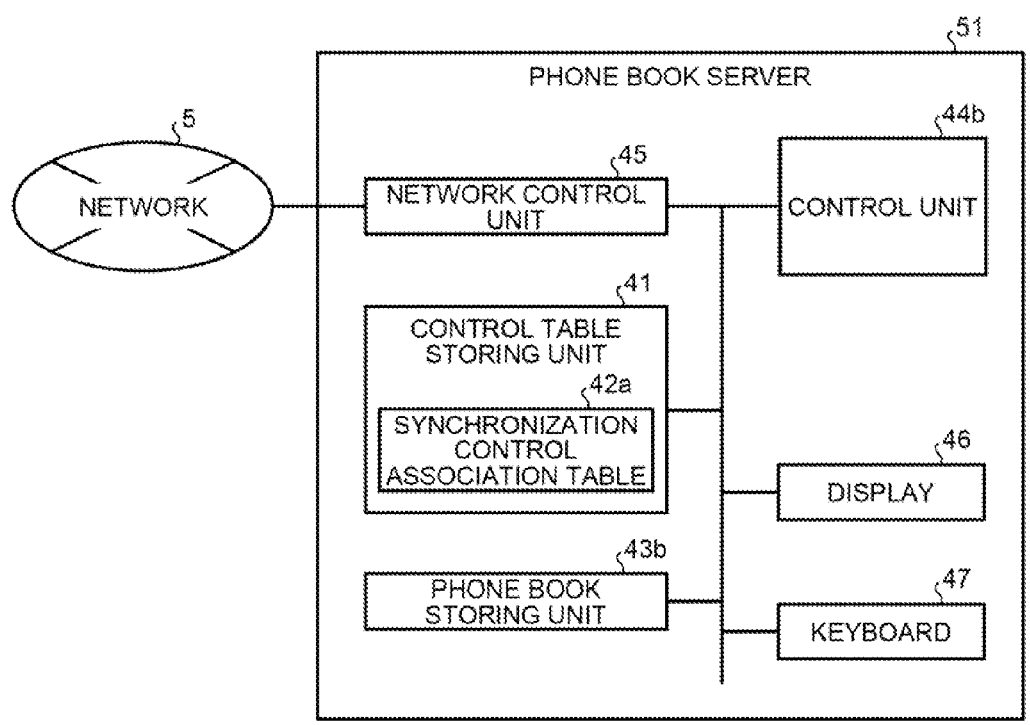
FIG. 6B is a schematic diagram illustrating an example of a phone book server according to the first embodiment.

In the following, an example of the phone book server 51 will be described with reference to the drawings. FIG. 6B is a schematic diagram illustrating an example of a phone book server according to the first embodiment. It is assumed that the control table storing unit 41, the network control unit 45, and the display 46 illustrated in FIG. 6B have the same functions as those performed by the control table storing unit 41, the network control unit 45, and the display 46, respectively, illustrated in FIG. 5A; therefore, descriptions thereof will be omitted. Furthermore, the keyboard 47 illustrated in FIG. 6B has the same function as that performed by the keyboard 47 illustrated in FIG. 5A; therefore, a description thereof will be omitted.

A phone book storing unit 43b stores therein data on a phone book for each mobile terminal device included in the communication system 1. For example, the phone book storing unit 43b stores therein, in an associated manner, an account of each mobile terminal device and data on a phone book of each mobile terminal device.

A control unit 44b performs the same process as that performed by the control unit 44a. Specifically, if a user updates the phone book stored in the phone book storing unit 43b by using a terminal device other than a mobile terminal device, such as a PC, the control unit 44b performs the following process. Namely, the control unit 44b creates data for updating the data on the phone book that has not been updated to the data on an updated phone book.

Then, the control unit 44b identifies the account associated with the data on the updated phone book and refers to the flag that is associated with the identified account and that is stored in the synchronization control association table 42a. If the referred flag indicates that data delivery is performed, the control unit 44b transmits data for updating the phone book to the mobile terminal device indicated by the identified account. In contrast, if the referred flag indicates that data delivery is not performed, the control unit 44b does not transmit data for updating the phone book.

Furthermore, if the control unit 44b receives the control notification from the mobile terminal device 10, similarly to the control unit 44a, the control unit 44b refers to the synchronization control association table 42a and updates the flag associated with the account of the mobile terminal device 10 to a flag indicating data delivery is not performed. Furthermore, if the control unit 44b receives the release notification from the mobile terminal device 10, the control unit 44b refers to the synchronization control association table 42a and updates the flag associated with the account of the mobile terminal device 10 to a flag indicating the data delivery is performed.

Figure 7:
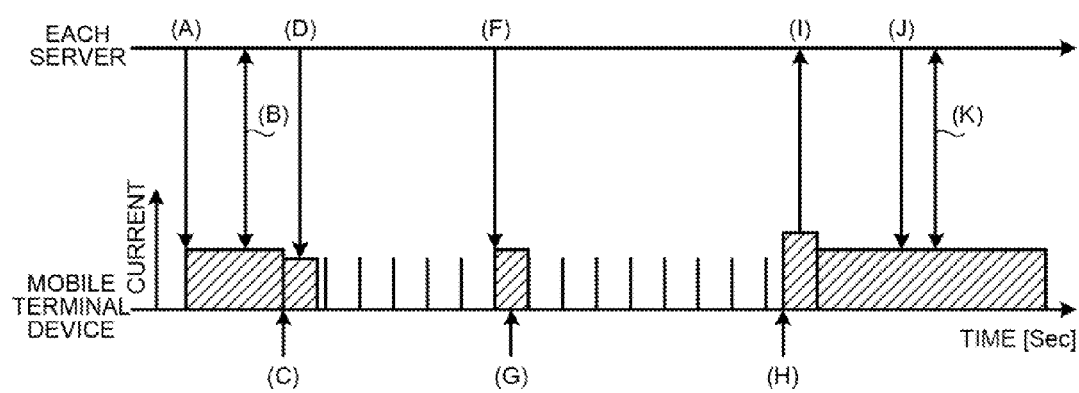
FIG. 7 is a schematic diagram illustrating the electrical power consumed by the mobile terminal device according to the first embodiment.

In the following, an example of the electrical power consumed by the mobile terminal device 10 will be described with reference to FIG. 7. FIG. 7 is a schematic diagram illustrating the electrical power consumed by the mobile terminal device according to the first embodiment. In the example illustrated in FIG. 7, the horizontal axis indicates the time and the vertical axis indicates the amount of current flowing in the mobile terminal device 10.

Furthermore, in the example illustrated in FIG. 7, the arrows indicate when an email is transmitted and received between the mobile terminal device 10 and each of the servers 40, 50, and 51. In the example illustrated in FIG. 7, it is assumed that, if the mobile terminal device 10 is in a standby state, the mobile terminal device 10 receives only a push-type email and stores therein the service information 14 indicating that data for synchronizing calendars and phone books is not received. The current that constantly flows illustrated in the lower part in FIG. 7 is the current flowing when position information transmitted from the base station 2 is received.

For example, at the time indicated by the arrow (A) in FIG. 7, the mail server 40 performs the push-type email delivery on the mobile terminal device 10. Furthermore, at the time indicated by the arrow (B) in FIG. 7, the calendar server 50 or the phone book server 51 performs synchronization of the calendars or the phone books with the mobile terminal device 10. Then, if the mobile terminal device 10 determines that it will shift to a standby state at the time indicated by the arrow (C) in FIG. 7, the mobile terminal device 10 transmits the setting notification to the calendar server 50 and the phone book server 51 at the time indicated by the arrow (D) in FIG. 7.

If the mail server 40 receives an email whose destination is the mobile terminal device 10 at the time indicated by the arrow (F) in FIG. 7, because the mail server 40 has not received the setting notification from the mobile terminal device 10, the mail server 40 performs the push-type email delivery service on the mobile terminal device 10. Specifically, the mail server 40 transmits an email to the mobile terminal device 10. Furthermore, the mobile terminal device 10 receives a push-type email, as indicated by the symbol (G) in FIG. 7.

Furthermore, both the calendar server 50 and the phone book server 51 receive the setting notification from the mobile terminal device 10 at the time indicated by the arrow (D) in FIG. 7. Accordingly, even if the calendars or the phone books stored in the calendar server 50 and the phone book server 51, respectively, are updated, the calendar server 50 and the phone book server 51 wait, without transmitting data for performing the synchronization, until they receive the release notification from the mobile terminal device 10.

If the mobile terminal device 10 determines that it will release the standby state at the time indicated by the arrow (H) in FIG. 7, the mobile terminal device 10 transmits the release notification to both the calendar server 50 and the phone book server 51, as indicated by the arrow (I) in FIG. 7. Then, as indicated by the arrow (J) in FIG. 7, the mobile terminal device 10 receives an email from the mail server 40, and, as indicated by the arrow (K) in FIG. 7, the mobile terminal device 10 receives data from the calendar server 50 or the phone book server 51 and synchronizes the calendars or the phone books.

Figure 8:
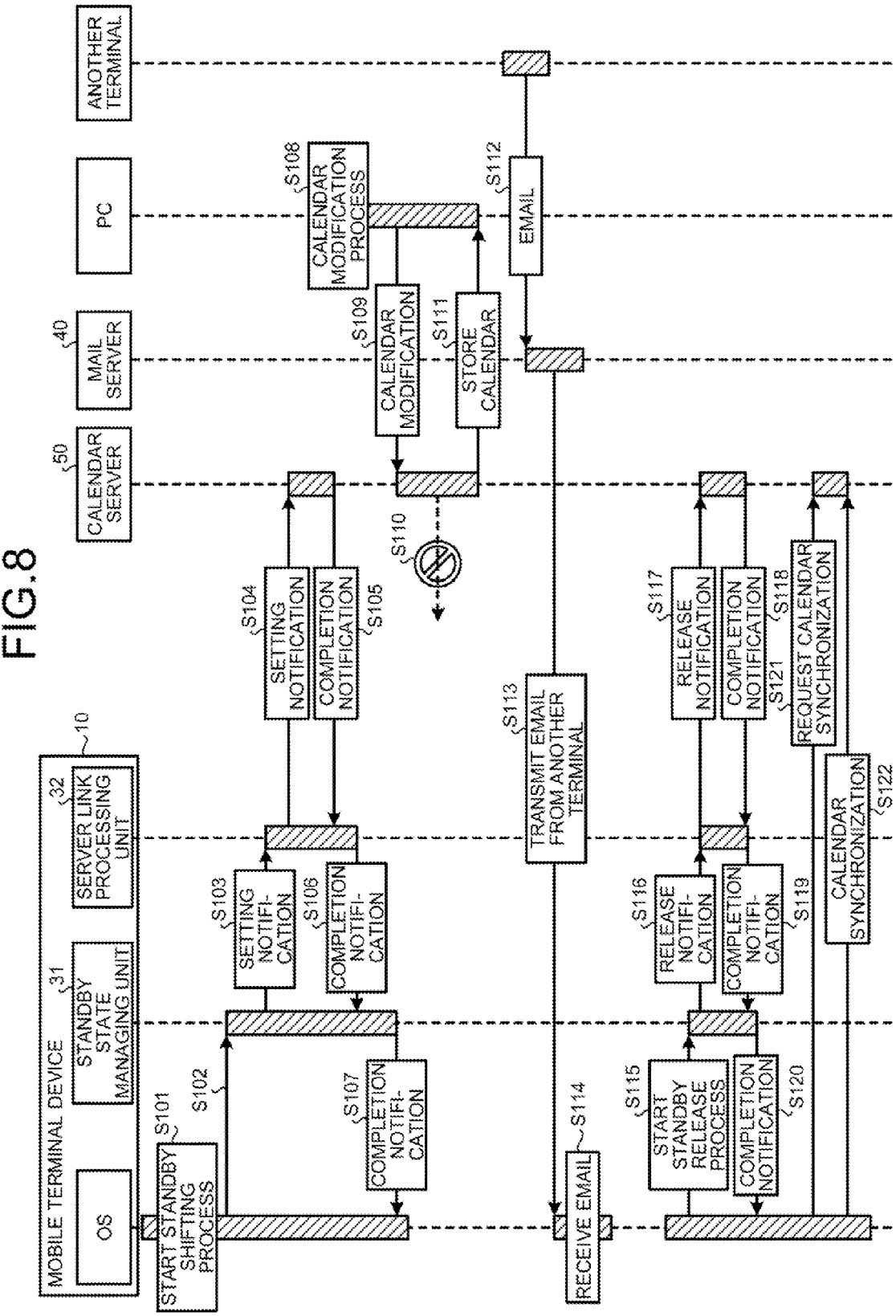
FIG. 8 is a schematic diagram illustrating the flow of a process performed by a communication system according to the first embodiment (No. 1)

In the following, an example of the flow of a process performed by the communication system 1 will be described with reference to the drawings. First, there will be descriptions of, with reference to FIG. 8, an example of a process performed by the communication system 1 when only a push-type email is received when the mobile terminal device 10 is in a standby state. FIG. 8 is a schematic diagram illustrating the flow of a process performed by a communication system according to the first embodiment (No. 1). FIG. 8 illustrates an example in which a PC modifies the calendar of the mobile terminal device 10 stored in the calendar server 50 and the mail server 40 receives, from another mobile terminal device (another terminal), an email whose destination is the mobile terminal device 10.

First, in the example illustrated in FIG. 8, an operating system (OS) executed by the mobile terminal device 10 starts a standby shifting process (S101) and allows the standby state managing unit 31 to determine whether to shift the state of the mobile terminal device 10 to the standby state (S102). Then, if the standby state managing unit 31 determines that it will shift to the standby state, the standby state managing unit 31 transmits, to the server link processing unit 32 during the standby state, the notification indicating the stopping of the service and the setting notification (S103).

Then, if the server link processing unit 32 receives the notification indicating the stopping of the service and the setting notification from the standby state managing unit 31, the server link processing unit 32 transmits the received setting notification to a server that provides the service indicated by the received notification (S104). In the example illustrated in FIG. 8, the server link processing unit 32 transmits the setting notification to the calendar server 50.

In such a case, after the calendar server 50 updates the synchronization control association table 42a, the calendar server 50 transmits a completion notification to the server link processing unit 32 (S105). Furthermore, if the server link processing unit 32 receives the completion notification, the server link processing unit 32 transmits the received completion notification to the standby state managing unit 31 (S106). Then, if the standby state managing unit 31 receives the completion notification, the standby state managing unit 31 transmits the completion notification to the OS (S107).

At this time, the PC starts a calendar modification process (S108), and the calendar server 50 modifies the calendar of the mobile terminal device 10 that is stored in the calendar server 50 (S109). In such a case, the calendar server 50 has already received the setting information from the mobile terminal device 10 at S104. Accordingly, instead of not transmitting data for synchronizing the calendar of the mobile terminal device 10 to the mobile terminal device 10 (S110), the calendar server 50 only performs a process for storing the updated calendar (S111).

The mail server 40 receives, from another terminal, an email whose destination is the mobile terminal device 10 (S112). At this time, because the mail server 40 does not receive the setting notification at S104, the mail server 40 transmits the received email to the mobile terminal device 10 (S113). Accordingly, the mobile terminal device 10 receives only an email even if the mobile terminal device 10 is in a standby state (S114).

If the OS receives an operation performed by a user at this time, the OS starts a standby release process and allows the standby state managing unit 31 to determine whether it will release the standby state (S115). Then, if the standby state managing unit 31 determines that it will release the standby state, the standby state managing unit 31 transmits, to the server link processing unit 32, the release notification indicating the resumption of the service that is stopped when the mobile terminal device 10 is in a standby state (S116).

In such a case, the server link processing unit 32 transmits the release notification to the server that provides the service that is stopped in the standby state, i.e., the calendar server 50 (S117). When the calendar server 50 receives the release notification, the calendar server 50 updates the synchronization control association table 42*a* and then transmits a completion notification to the server link processing unit 32 (S118). When the server link processing unit 32 receives the completion notification, the server link processing unit 32 transmits the received completion notification to the standby state managing unit (S119). Then, the standby state managing unit 31 receives the completion notification and transmits the received completion notification to the OS (S120).

If a user manually starts an application of a calendar or the like, the OS calendar transmits a synchronization request to the calendar server 50 (S121). In such a case, the calendar server 50 transmits the data for synchronizing the calendars to the OS of the mobile terminal device 10 and synchronizes the calendar stored in the mobile terminal device 10 with the calendar stored in the calendar server 50 (S122).

Figure 9:
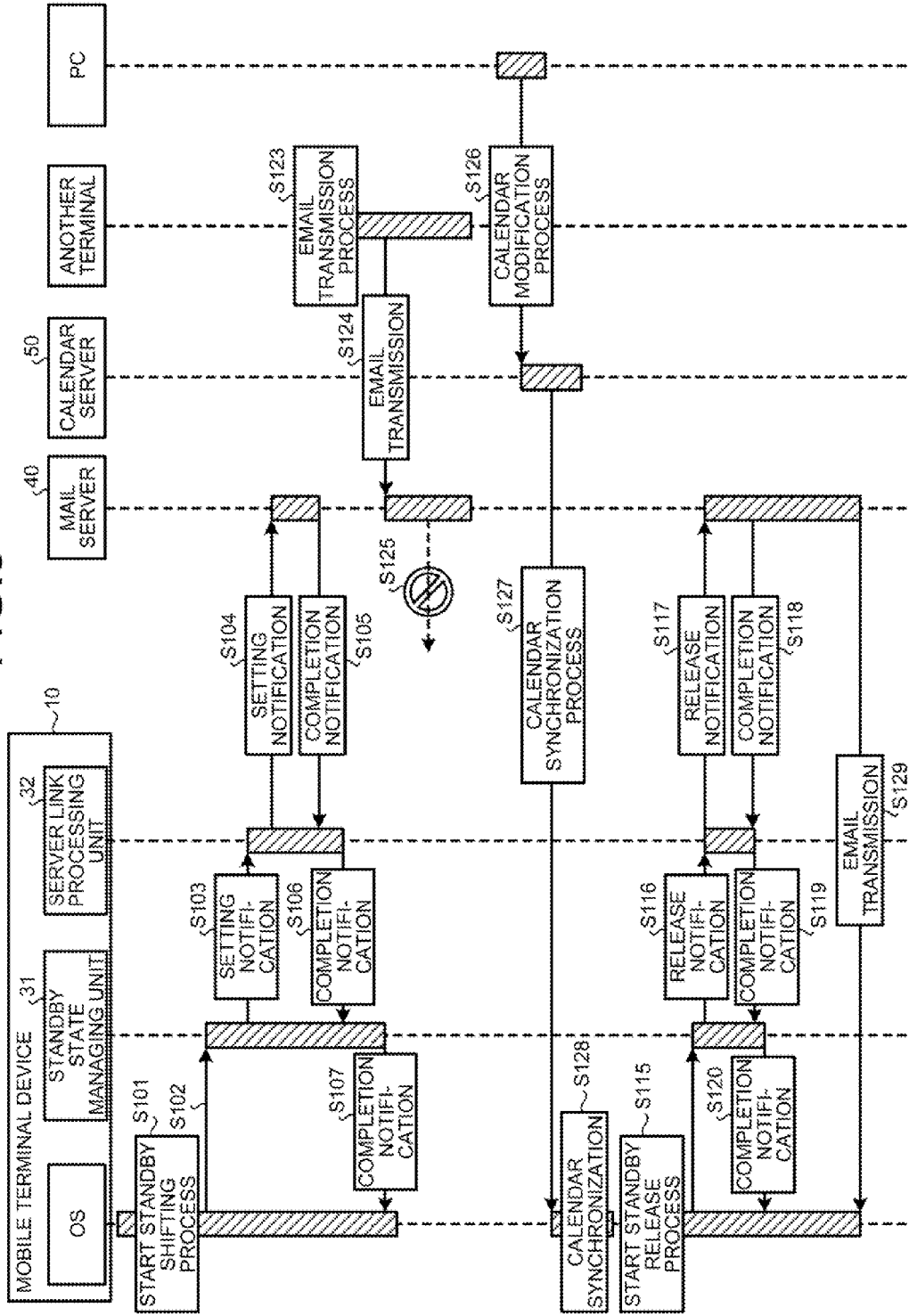
FIG. 9 is a schematic diagram illustrating the flow of a process performed by the communication system according to the first embodiment (No. 2)

In the following, there will be descriptions of, with reference to FIG. 9, an example of a process performed by the communication system 1 when the mobile terminal device 10 receives only the data for synchronizing calendars when it is in a standby state. FIG. 9 is a schematic diagram illustrating the flow of a process performed by the communication system according to the first embodiment (No. 2). It is assumed that processes performed at S101 to S107 and S115 to S120 illustrated in FIG. 9 are the same as those performed at S101 to S107 and S115 to S120 illustrated in FIG. 8; therefore, descriptions thereof in detail will be omitted. Furthermore, in the example illustrated in FIG. 9, it is assumed that the mobile terminal device 10 has already transmitted the setting notification to the mail server 40 at S104.

For example, in the example illustrated in FIG. 9, another terminal performs a transmission process on an email whose destination is the mobile terminal device 10 (S123) and transmits, to the mail server 40, an email whose destination is the mobile terminal device 10 (S124). Because the mail server 40 has already received the setting notification from the mobile terminal device 10 at S104, the mail server 40 ends the process without transmitting the email to the mobile terminal device 10 (S125).

In contrast, the calendar server 50 has not received the setting notification at S104. Accordingly, if a calendar stored in the mobile terminal device 10 is modified by the PC (S126), the calendar server 50 transmits the data for synchronizing the calendars to the mobile terminal device 10 (S127). In such a case, the OS in the mobile terminal device 10 receives the data for synchronizing the calendars and synchronizes the calendar stored in the mobile terminal device 10 with the calendar stored in the calendar server 50 (S128).

The mail server 40 receives the release notification from the mobile terminal device 10 (S117). If the mail server 40 transmits the completion notification (S118), the mail server 40 transmits the email received at S124 to the mobile terminal device 10 (S129).

As described above, if the mobile terminal device 10 shifts to a standby state, the mobile terminal device 10 transmits, to a server that provides a service that is stopped during the standby state, the setting notification that instructs the stopping of the service. Accordingly, the mobile terminal device 10 limits the push email service that is received during the standby state; therefore, the mobile terminal device 10 can reduce the amount of electrical power consumption.

Figure 10:
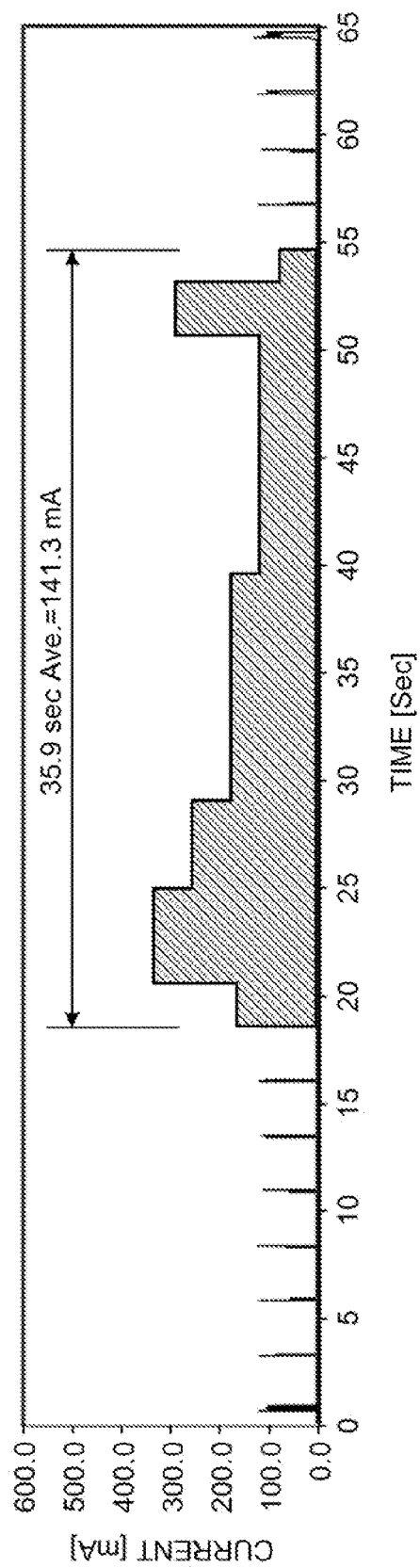
FIG. 10 is a schematic diagram illustrating an example of the amount of electrical power consumed by the mobile terminal device (No. 1)

In the following, an example of the amount of electrical power consumed by the mobile terminal device will be described with reference to FIGS. 10 to 13. FIG. 10 is a schematic diagram illustrating an example of the amount of electrical power consumed by the mobile terminal device (No. 1). FIG. 10 schematically illustrates an example of the current flowing in, for example, a Galaxy-S (registered trademark), which is an example of the mobile terminal device 10, manufactured by Samsung Electronics Co., Ltd (registered trademark) that executes Android (registered trademark) 2.2 as an OS.

Furthermore, FIG. 10 illustrates an example of the current flowing when the mobile terminal device 10 receives a push-type email. Furthermore, in the example illustrated in FIG. 10, the horizontal axis indicates the time [Sec] elapsed after the starting of the measurement and the vertical axis indicates the measured current [mA]. In FIG. 10, the current flowing at 2.56-sec intervals is the current flowing when position information transmitted from the base station 2 is received. Furthermore, the shaded portion in FIG. 10 schematically illustrates the range in which the current continuously flows.

In the example illustrated in FIG. 10, when the mobile terminal device 10 receives an email, an average current of 141.3 [mA] flows for 35.9 [Sec]. This indicates that the amount of electrical power consumed is the same as that consumed by the mobile terminal device 10 when it performs a telephone call for 28.2 seconds over a 3G network, such as FOMA (registered trademark).

Figure 11:
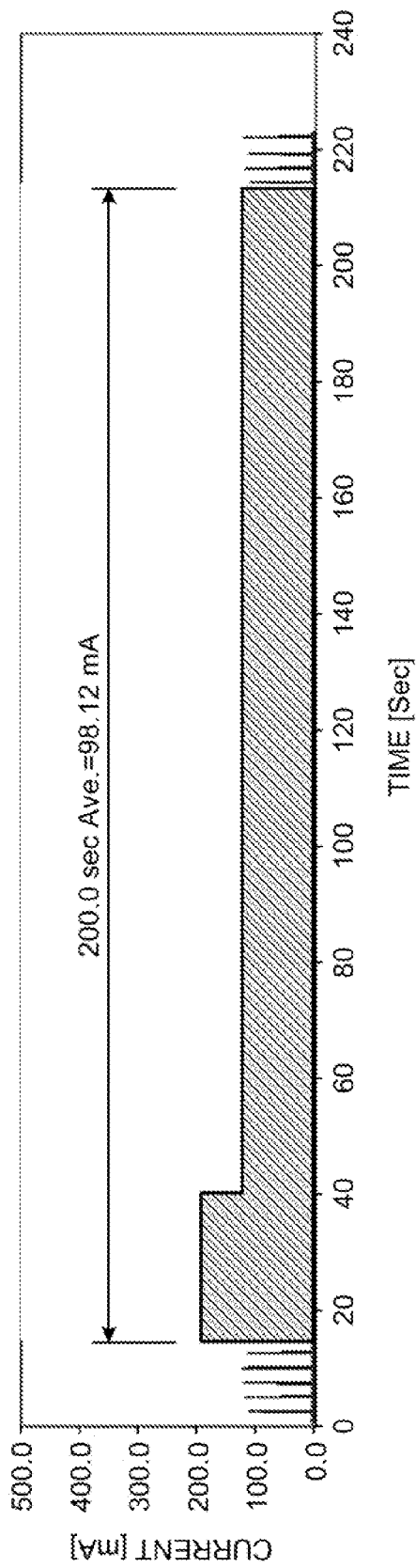
FIG. 11 is a schematic diagram illustrating an example of the amount of electrical power consumed by the mobile terminal device (No. 2)

FIG. 11 is a schematic diagram illustrating an example of the amount of electrical power consumed by the mobile terminal device (No. 2). FIG. 11 schematically illustrates an example of the current flowing in the mobile terminal device 10, which is the same device as that used in FIG. 10, when it synchronizes calendars. In the example illustrated in FIG. 11, similarly to the example illustrated in FIG. 10, the horizontal axis indicates the time [Sec] elapsed after the starting of the measurement and the vertical axis indicates the measured current [mA]. Furthermore, similarly to the example illustrated in FIG. 10, the shaded portion in FIG. 11 schematically illustrates the range in which the current continuously flows.

In the example illustrated in FIG. 11, when the mobile terminal device 10 synchronizes calendars, an average current of 98.12 [mA] flows for 200.0 [Sec]. This indicates that the amount of electrical power consumed is the same as that consumed by the mobile terminal device 10 when it performs a telephone call for 109 seconds.

Figure 12:
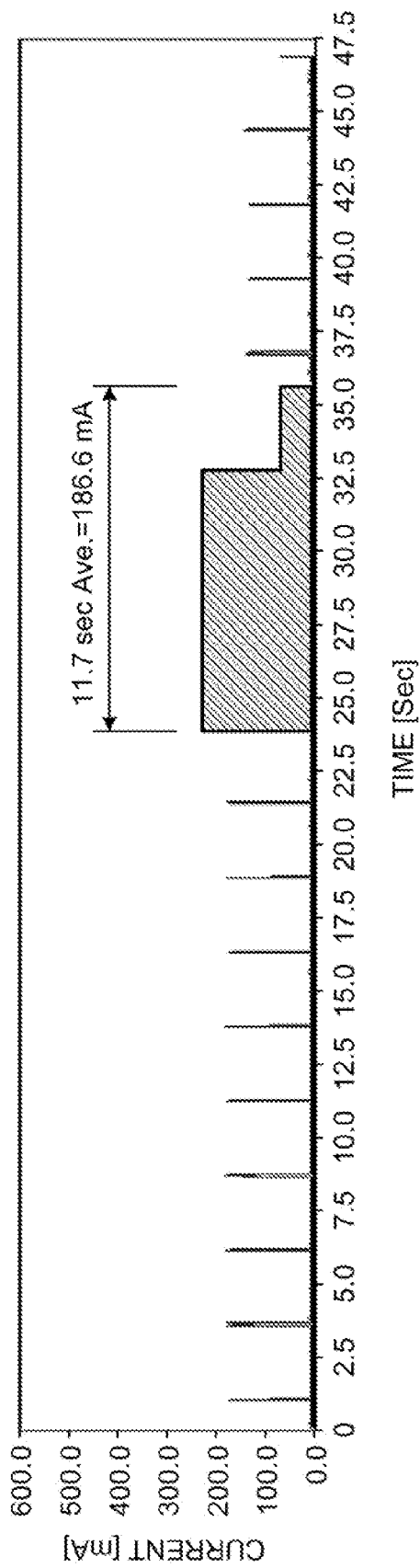
FIG. 12 is a schematic diagram illustrating an example of the amount of electrical power consumed by the mobile terminal device (No. 3)

FIG. 12 is a schematic diagram illustrating an example of the amount of electrical power consumed by the mobile terminal device (No. 3). FIG. 12 schematically illustrates an example of the current flowing in, for example, an HT-03A (registered trademark), which is an example of the mobile terminal device 10, manufactured by HTC Co. (registered trademark) that executes Android 1.6. Furthermore, FIG. 12 illustrates an example of the current flowing when the mobile terminal device 10 receives a push-type email. Furthermore, in the example illustrated in FIG. 12, similarly to the example illustrated in FIG. 10, the horizontal axis indicates the time [Sec] elapsed after the starting of the measurement and the vertical axis indicates the measured current [mA]. Furthermore, similarly to the example illustrated in FIG. 10, the shaded portion in FIG. 12 schematically illustrates the range in which the current continuously flows.

In the example illustrated in FIG. 12, when the mobile terminal device 10 receives an email, an average current of 186.6 [mA] flows for 11.7 [Sec]. This indicates that the amount of electrical power consumed is the same as that consumed by the mobile terminal device 10 when it performs a telephone call for 12.1 seconds.

Figure 13:
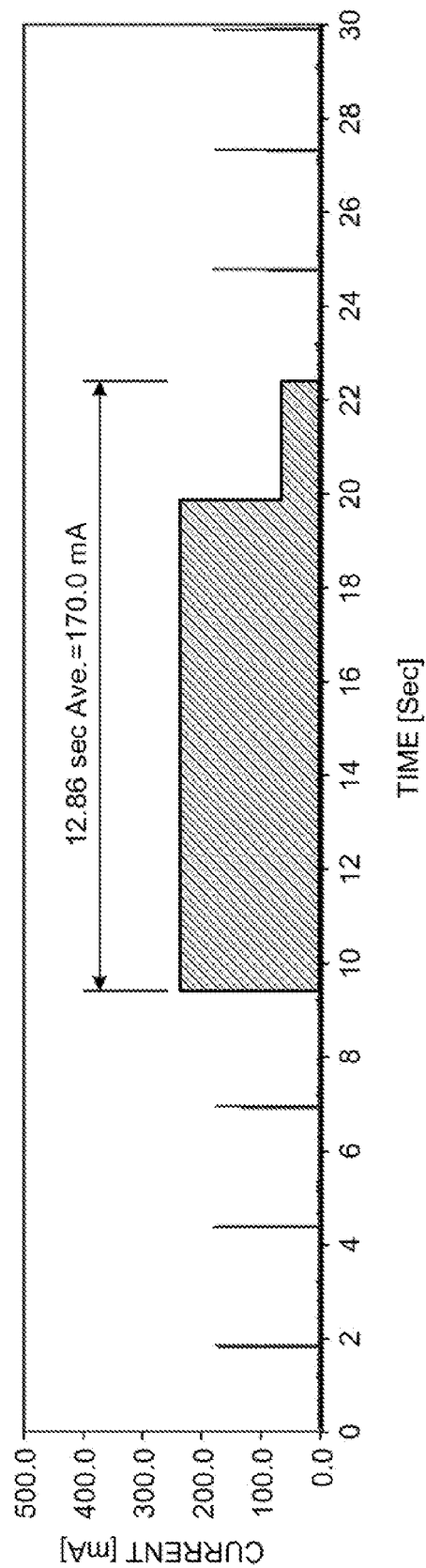
FIG. 13 is a schematic diagram illustrating an example of the amount of electrical power consumed by the mobile terminal device (No. 4)

FIG. 13 is a schematic diagram illustrating an example of the amount of electrical power consumed by the mobile terminal device (No. 4). FIG. 13 schematically illustrates an example of the current flowing in the same mobile terminal device 10 illustrated in FIG. 12 when it synchronizes calendars. Furthermore, in the example illustrated in FIG. 13, similarly to the example illustrated in FIG. 10, the horizontal axis indicates the time [Sec] elapsed after the starting of the measurement and the vertical axis indicates the measured current [mA]. Furthermore, similarly to the example illustrated in FIG. 10, the shaded portion in FIG. 13 schematically illustrates the range in which the current continuously flows.

In the example illustrated in FIG. 13, when the mobile terminal device 10 synchronizes calendars, an average current of 170.0 [mA] flows for 12.86 [Sec]. This indicates that the amount of electrical power consumed is the same as that consumed by the mobile terminal device 10 when it performs a telephone call for 12.1 seconds.

As described above, when the mobile terminal device 10 receives an email or synchronizes calendars, it consumes electrical power greater than that consumed when it is in a standby state. Accordingly, when the mobile terminal device 10 shifts to a standby state, by limiting the push email service received during the standby state, the mobile terminal device 10 can reduce the amount of electrical power consumption. Accordingly, it is possible for the mobile terminal device 10 to extend the length of the time for which the standby state is maintained.

For example, the control unit 30, the standby state managing unit 31, and the server link processing unit 32 are electronic circuits. Examples of the electronic circuits include an integrated circuit, such as an application specific integrated circuit (ASIC) and a field programmable gate array (FPGA), a central processing unit (CPU), or a micro processing unit (MPU).

The memory 13 is a semiconductor memory device, such as a random access memory (RAM), a read only memory (ROM), and a flash memory, or a storage device, such as a hard disk and an optical disk.

Figure 14:
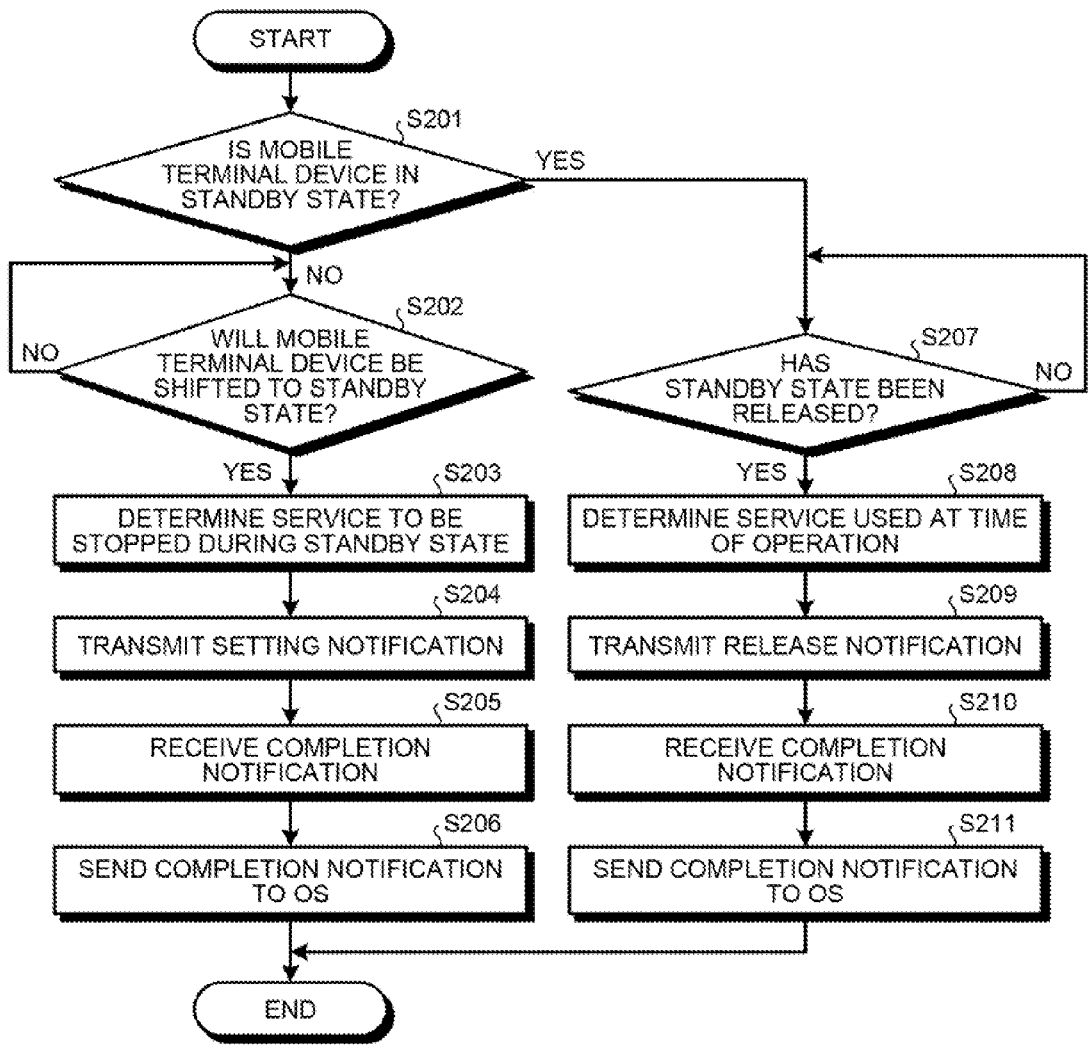
FIG. 14 is a flowchart illustrating the flow of a process performed by the mobile terminal device according to the first embodiment.

In the following, an example of a process performed by the mobile terminal device 10 will be described with reference to FIG. 14. FIG. 14 is a flowchart illustrating the flow of a process performed by the mobile terminal device according to the first embodiment. In the example illustrated in FIG. 14, the mobile terminal device 10 determines whether it is in a standby state (S201).

If the mobile terminal device 10 determines that its state is not a standby state (No at S201), the mobile terminal device 10 determines whether to shift its state to a standby state (S202). Furthermore, if the mobile terminal device 10 determines that it will not shift its state to a standby state (No at S202), the mobile terminal device 10 again determines whether to shift its state to a standby state after a predetermined time period (S202).

In contrast, if the mobile terminal device 10 determines that it will shift its state to a standby state (Yes at S202), the mobile terminal device 10 determines, from the service information 14, a service that will be stopped during the standby state (S203). Then, the mobile terminal device 10 transmits the setting notification to the server that provides the determined service (S204). Then, the mobile terminal device 10 receives a completion notification (S205) and sends the completion notification to the OS (S206).

In contrast, if the mobile terminal device 10 is in a standby state (Yes at S201), the mobile terminal device 10 determines whether to release the standby state (S207). If the mobile terminal device 10 determines that it will not release the standby state (No at S207), the mobile terminal device 10 again determines whether to release the standby state after a predetermined time period (S207).

If the mobile terminal device 10 determines that it will release the standby state (Yes at S207), the mobile terminal device 10 determines a service that is used at the time of operation (S208) and transmits the release notification to the server that provides the determined service (S209). Then, the mobile terminal device 10 receives a completion notification from the server (S210) and sends the completion notification to the OS (S211).

Advantage of the First Embodiment

As described above, the mobile terminal device 10 stores therein the service information 14 indicating whether data or an email related to the push email service will be received when it is in a standby state. Furthermore, the mobile terminal device 10 determines whether to shift its state to a standby state. If the mobile terminal device 10 determines that it will shift to a standby state, the mobile terminal device 10 transmits, to the server that provides the push email service, the setting notification that instructs the stopping of the push email service on the basis of the service information 14.

Accordingly, the mobile terminal device 10 can limit the data that is received when the mobile terminal device 10 is in a standby state. In other words, the mobile terminal device 10 can limit the push email service that is provided when the mobile terminal device 10 is in a standby state. Consequently, the mobile terminal device 10 limits data or an email related to the push email service; therefore, the electrical power consumption can be reduced and the standby time can be extended.

Furthermore, the mobile terminal device 10 stores therein the service information 14 that indicates, for each type of service, whether data or an email is received when it is in a standby state. Accordingly, the mobile terminal device 10 can select a service that is provided when it is in a standby state while reducing the amount of electrical power consumption.

For example, if the mobile terminal device 10 wants to always synchronize a business-use calendar with a calendar stored in the calendar server, the mobile terminal device 10 associates the service "calendar" with the flag "1" and associates another service with the flag "0". In such a case, even when the mobile terminal device 10 is in a standby state, the mobile terminal device 10 can allow the calendar server 50 to transmit data for synchronizing the calendars and can allow another server that provides the push-type service to stop the transmission of data or an email. Accordingly, the mobile terminal device 10 can always receive data to be received while reducing the amount of electrical power consumption.

Furthermore, if the mobile terminal device 10 is in a standby state, the mobile terminal device 10 determines whether to release the standby state. If the mobile terminal device 10 determines that it will release the standby state, the mobile terminal device 10 performs the following process. Namely, the mobile terminal device 10 transmits, to the server that has transmitted the setting notification, the release notification indicating the resumption of the push email service.

Accordingly, when the mobile terminal device 10 releases the standby state, the mobile terminal device 10 can promptly receive data or an email related to the service that is stopped. Consequently, the mobile terminal device 10 can improve the operability while reducing the amount of electrical power consumption.

Furthermore, the mobile terminal device 10 can select a service for receiving an email or data even when the mobile terminal device 10 is in a standby state. Specifically, the mobile terminal device 10 can receive an email or data related to a service always to be provided even if the mobile terminal device 10 is in a standby state.

[b] Second Embodiment

In the above explanation, the embodiment of the present invention have been described; however, the present invention can be implemented with various kinds of embodiments other than the embodiment described above. Accordingly, in the following, another embodiment included in the present invention will be described as a second embodiment.

(1) Timing of Setting Notification Transmission

The mobile terminal device 10 described above transmits the setting notification when it shifts to a standby state; however, the embodiment is not limited thereto. In the following, as another embodiment according to the mobile terminal device 10, a description will be given of a case in which the setting notification is transmitted after a predetermined time period since the mobile terminal device 10 shifted to the standby state.

Figure 15A:
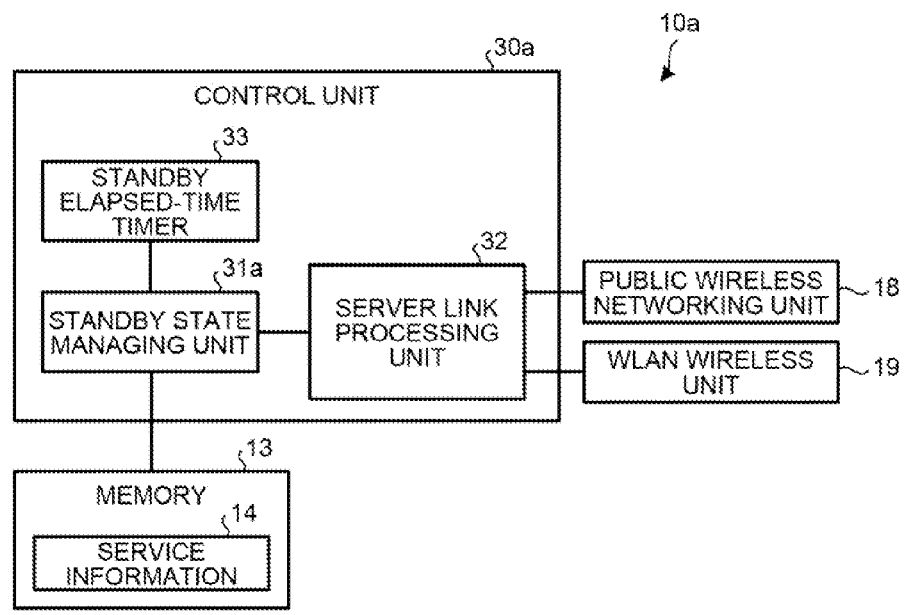
FIG. 15A is a schematic diagram illustrating an example of a control unit according to a second embodiment.

For example, a mobile terminal device 10a includes a control unit 30a illustrated in FIG. 15A. FIG. 15A is a schematic diagram illustrating an example of a control unit according to a second embodiment. In the example illustrated in FIG. 15A, the control unit 30a includes a standby state managing unit 31a, the server link processing unit 32, and a standby elapsed-time timer 33. It is assumed that the server link processing unit 32 has the same function as that performed by the server link processing unit 32 according to the first embodiment; therefore, a description thereof will be omitted.

The standby state managing unit 31a has the same function as that performed by the standby state managing unit 31. Specifically, if the standby state managing unit 31a determines that it will shift the mobile terminal device 10a to a standby state, the standby state managing unit 31a shifts the mobile terminal device 10a to a standby state. Furthermore, if the standby state managing unit 31a has shifted the mobile terminal device 10a to a standby state, the standby state managing unit 31a transmits, to the standby elapsed-time timer 33, a notification indicating that the mobile terminal device 10a has shifted to a standby state. Furthermore, if the standby state managing unit 31a determines that it will release the standby state, the standby state managing unit 31a transmits, to the standby elapsed-time timer 33, a notification indicating that the standby state has been released.

Furthermore, if the standby state managing unit 31a receives, from the standby elapsed-time timer 33, a notification indicating that a predetermined time period has elapsed since the shifting to the standby state, the standby state managing unit 31a refers to the service information 14 stored in the memory 13 and determines whether a push email service is to be stopped during the standby state. Thereafter, similarly to the standby state managing unit 31, the standby state managing unit 31a transmits the determined service and the determined setting notification to the server link processing unit 32.

If the standby elapsed-time timer 33 receives, from the standby state managing unit 31a, a notification indicating that the mobile terminal device 10a has shifted its state to a standby state, the standby elapsed-time timer 33 starts measuring the time and measures the elapsed time period since the mobile terminal device 10a shifted to the standby state. Then, if a predetermined time period has elapsed since the mobile terminal device 10a shifted to the standby state, the standby elapsed-time timer 33 transmits, to the standby state managing unit 31a, a notification indicating that a predetermined time period has elapsed since the mobile terminal device 10a shifted to the standby state. Furthermore, if the standby elapsed-time timer 33 receives a notification indicating the release of the standby state from the standby state managing unit 31, the standby elapsed-time timer 33 stops measuring the time. In other words, the standby elapsed-time timer 33 resets the counted time.

Figure 15B:
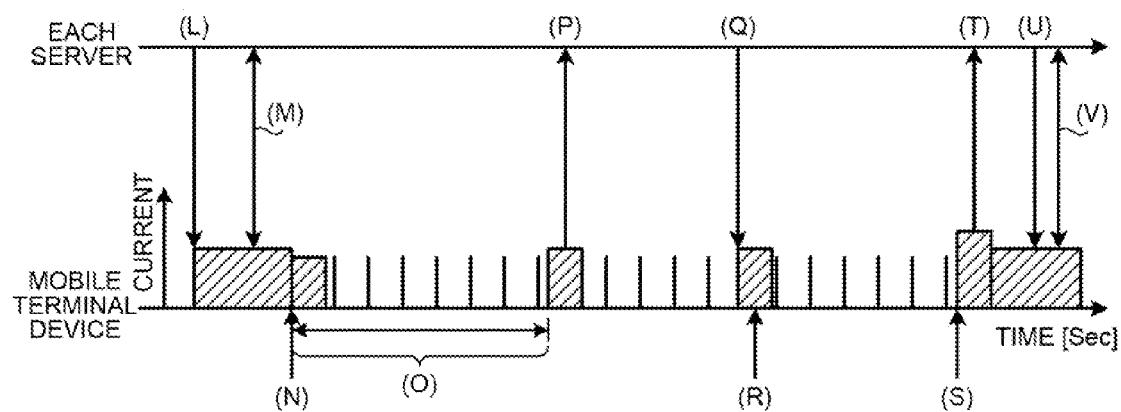
FIG. 15B is a schematic diagram illustrating when the setting notification is transmitted by a mobile terminal device according to the second embodiment.

In the following, when the mobile terminal device 10a included in the control unit 30a transmits the setting notification will be described with reference to FIG. 15B. FIG. 15B is a schematic diagram illustrating when the setting notification is transmitted by a mobile terminal device according to the second embodiment. In the example illustrated in FIG. 15B, similarly to the example illustrated in FIG. 7, the horizontal axis indicates the time; the vertical axis indicates the amount of current flowing in the mobile terminal device 10a; and the arrows indicate when data, such as an email, is transmitted and received between the mobile terminal device 10a and each of the servers 40, 50, and 51. Furthermore, in the example illustrated in FIG. 15B, similarly to the example illustrated in FIG. 7, it is assumed that the mobile terminal device 10a receives only a push-type email when it is in a standby state.

For example, at the time indicated by the arrow (L) in FIG. 15B, the mail server 40 performs the push-type email delivery on the mobile terminal device 10a. Furthermore, at the time indicated by the arrow (M) in FIG. 15B, the calendar server 50 or the phone book server 51 synchronizes calendars or phone books, respectively, with the mobile terminal device 10a. If the mobile terminal device 10a determines that it will shift to a standby state at the time indicated by the arrow (N) in FIG. 15B, the mobile terminal device 10a shifts to the standby state without processing anything, for example, without transmitting the setting notification.

Then, as indicated by the arrow (O) in FIG. 15B, if a predetermined time period has elapsed since the mobile terminal device 10a shifted to the standby state, the mobile terminal device 10a transmits the setting notification to the calendar server 50 and the phone book server 51 at the time indicated by the arrow (P) in FIG. 15B. Furthermore, as indicated by the arrow (Q) in FIG. 15B, the mail server 40 performs the push-type email delivery service for the mobile terminal device 10a. If the mobile terminal device 10a receives an email at the time indicated by the arrow (R) in FIG. 15B, the mobile terminal device 10a only receives an email without activating a screen. Specifically, if the mobile terminal device 10a receives an email or synchronizes calendars when it is in a standby state, the mobile terminal device 10a only receives an email or only synchronizes calendars without activating a screen.

Furthermore, if the mobile terminal device 10a determines that it will release the standby state at the time indicated by the arrow (S) in FIG. 15B, the mobile terminal device 10a transmits the release notification to the calendar server 50 and the phone book server 51, as indicated by the arrow (T) in FIG. 15B. Then, as indicated by the arrow (U) in FIG. 15B, the mobile terminal device 10a receives an email from the mail server 40 and synchronizes calendars or phone books, respectively, with the calendar server 50 or the phone book server 51 as indicated by the arrow (V) in FIG. 15B.

Figure 16:
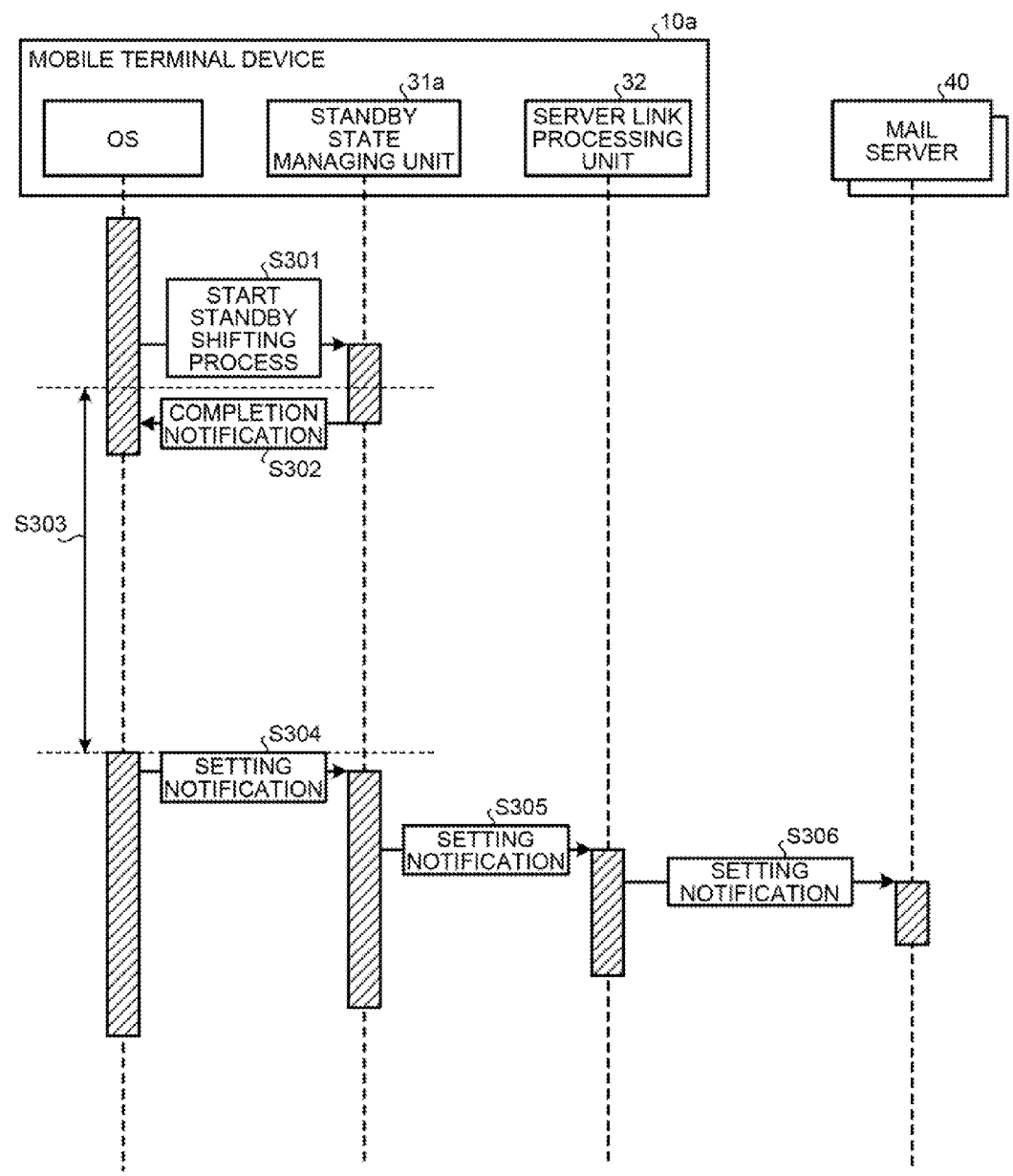
FIG. 16 is a schematic diagram illustrating an example of a process performed by the mobile terminal device according to the second embodiment.

In the following, an example of a process in which the mobile terminal device 10a according to the second embodiment transmits the setting notification will be described with reference to FIG. 16. FIG. 16 is a schematic diagram illustrating an example of a process performed by the mobile terminal device according to the second embodiment. The processes performed at S304 to S306 illustrated in FIG. 16 are the same as those performed at S102 to 5104 illustrated in FIG. 8; therefore, a description thereof will be omitted.

For example, the OS in the mobile terminal device 10a starts a standby shifting process and allows the standby state managing unit 31a to determine whether the mobile terminal device 10a will shift to a standby state (S301). Then, the standby state managing unit 31a determines that the mobile terminal device 10a will shift to a standby state and transmits a completion notification to the OS (S302). The OS in the mobile terminal device 10a allows the mobile terminal device 10a to shift its state to a standby state and wait until a predetermined time period has elapsed (S303).

Thereafter, if a predetermined time period has elapsed since the mobile terminal device 10a shifted to a standby state, the OS of the mobile terminal device 10a transmits the setting notification to the mail server 40 in a similar manner as the mobile terminal device 10 according to the first embodiment does (S304 to S306).

Figure 17:
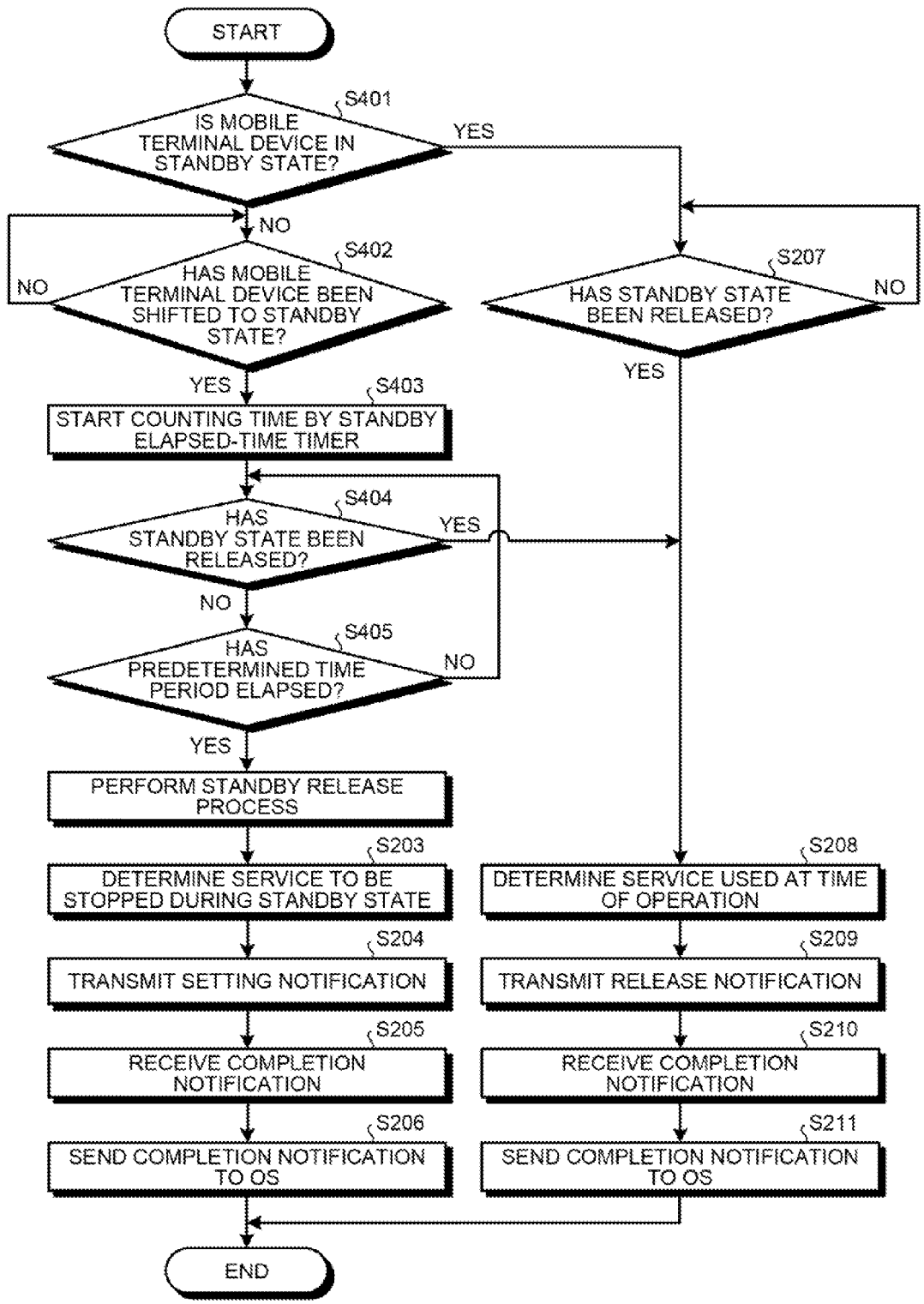
FIG. 17 is a flowchart illustrating an example of a process performed by the mobile terminal device according to the second embodiment.

In the following, the flow of a process performed by the mobile terminal device 10a according to the second embodiment will be described with reference to FIG. 17. FIG. 17 is a flowchart illustrating an example of a process performed by the mobile terminal device according to the second embodiment. Processes performed at S203 to S211 illustrated in FIG. 17 are the same as those performed at S203 to S211 illustrated in FIG. 14; therefore, descriptions thereof will be omitted.

For example, the mobile terminal device 10a determines whether the mobile terminal device 10a is in a standby state (S401). If the mobile terminal device 10a determines that it is not in a standby state (No at S401), the mobile terminal device 10a determines whether to shift to a standby state (S402). If the mobile terminal device 10a determines that it will not shift to a standby state (No at S402), the mobile terminal device 10a again determines whether to shift to a standby state after a predetermined time period (S402).

In contrast, if the mobile terminal device 10a determines that it will shift to a standby state (Yes at S402), the mobile terminal device 10a allows the standby elapsed-time timer 33 to start the counting (S403). Then, the mobile terminal device 10a determines whether to release the standby state (S404). If the mobile terminal device 10a determines that it will not release the standby state (No at S404), the mobile terminal device 10a performs the following process. Namely, by using the standby elapsed-time timer 33, the mobile terminal device 10a determines whether a predetermined time period has elapsed since it shifted to the standby state (S405).

If the mobile terminal device 10a determines that a predetermined time period has elapsed (Yes at S405), the mobile terminal device 10a determines a service to be stopped when the mobile terminal device 10a is in the standby state (S203). In contrast, if the mobile terminal device 10a determines that a predetermined time period has not elapsed (No at S405), the mobile terminal device 10a again determines whether to release the standby state (S404). If the mobile terminal device 10a determines that it will release the standby state (Yes at S404), the mobile terminal device 10a determines a service that is used when the mobile terminal device 10a is in operation (S208).

As described above, if the standby state is not released within a predetermined time period after the mobile terminal device 10a shifted its state to the standby state, the mobile terminal device 10a transmits the setting information that instructs to stop the push email service on the basis of service information. Accordingly, even if the mobile terminal device 10a frequently shifts to or releases the standby state, the mobile terminal device 10a can reduce the amount of electrical power consumption while suppressing an increase in the amount of processing.

(2) Operation Performed During Charging

The mobile terminal devices 10 and 10a described above transmits a control notification triggered when the mobile terminal devices 10 and 10a determine whether to shift to a standby state; however, the embodiments are not limited thereto. For example, if the mobile terminal devices 10 and 10a are being charged when they shift to a standby state, the mobile terminal devices 10 and 10a need not transmit the setting notification because there is no need to reduce the electrical power consumption.

In the following, a description will be given of a mobile terminal device 10b that does not transmit the setting notification when it is being charging at the time of shifting to a standby state. It is assumed that the mobile terminal device 10b has the same function as that performed by each of the mobile terminal devices 10 and 10a; therefore, descriptions of components included in the mobile terminal device 10b in detail will be omitted.

Figure 18:
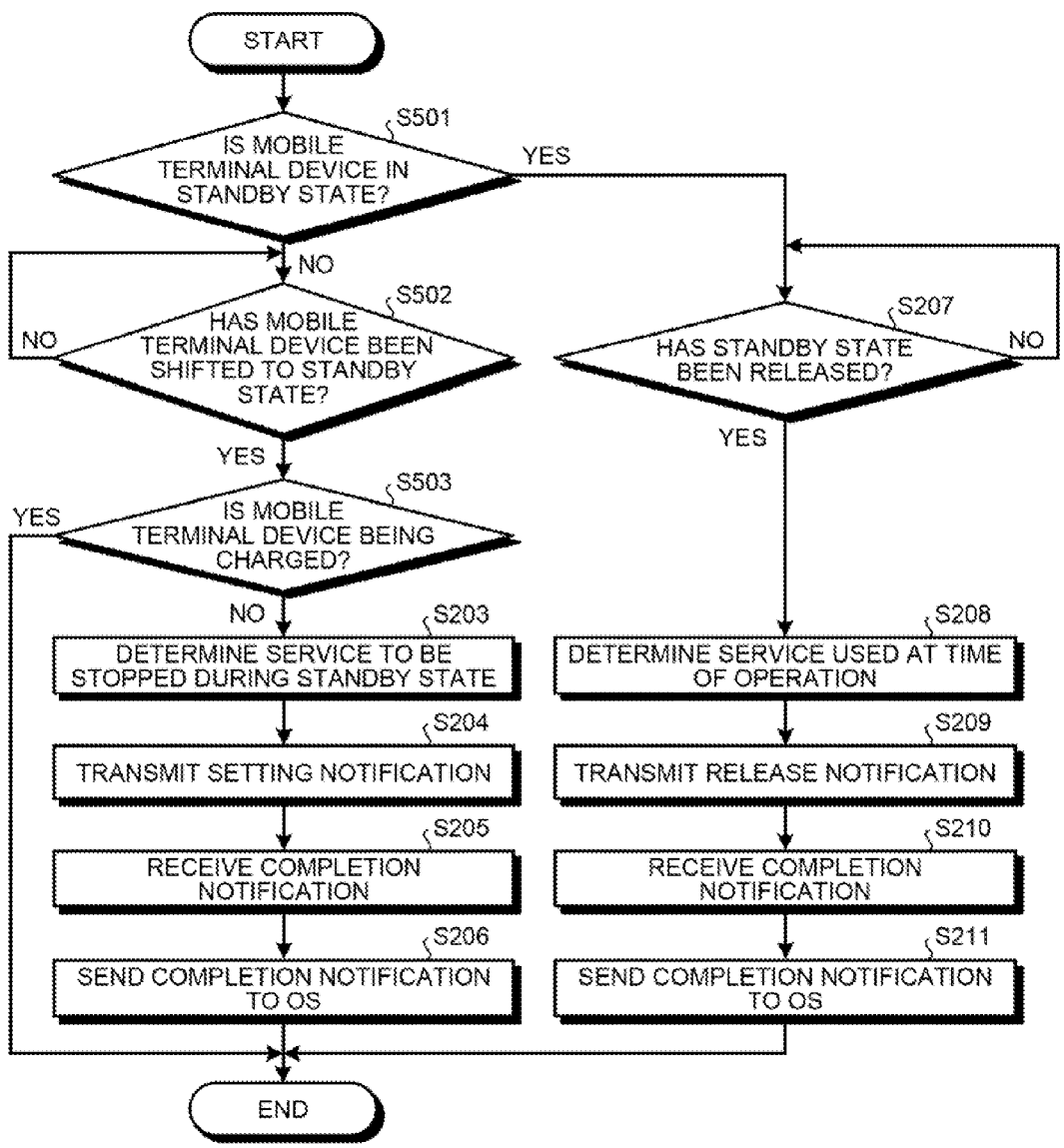
FIG. 18 is a flowchart illustrating an example of a process performed by a mobile terminal device that does not transmit a setting notification when the mobile terminal device is being charged.

FIG. 18 is a flowchart illustrating an example of a process performed by a mobile terminal device that does not transmit the setting notification when it is being charged. It is assumed that the processes performed at S203 to S211 illustrated in FIG. 18 are the same as those performed at S203 to S211 illustrated in FIG. 14; therefore, descriptions thereof will be omitted. Furthermore, it is assumed that the processes performed at S501 and S502 illustrated in FIG. 18 are the same as those performed at S401 and S402 illustrated in FIG. 17; therefore, descriptions thereof will be omitted.

If the mobile terminal device 10b determines that it will shift to a standby state (Yes at S502), the mobile terminal device 10b determines whether the charging is currently being performed (S503). If the mobile terminal device 10b determines that it is being charged (Yes at S503), the mobile terminal device 10b ends the process without performing a series of processes for transmitting the setting notification performed at S203 to S206. In contrast, if the mobile terminal device 10b determines that the charging is not currently being performed (No at S503), the mobile terminal device 10b determines a service to be stopped during the standby state (S203) and then the mobile terminal device 10b transmits the setting notification to the server that provides the determined service (S204).

As described above, if the mobile terminal device 10b is being charged when the mobile terminal device 10b determines that it will shift to a standby state, the mobile terminal device 10b does not transmit the setting notification to a server that provides the push email service. Accordingly, in a case in which the mobile terminal device 10b does not need to take into consideration saving electrical power, the mobile terminal device 10b continuously receives the push email service, thus improving the convenience for a user.

If charging is started after the mobile terminal device 10b has shifted its state to a standby state and has transmitted the setting notification to the server that provides the push email service, the mobile terminal device 10b may resume the push email service by transmitting the release notification to the server. In the following, the mobile terminal device 10b having this function will be described.

FIG. 19 is a schematic diagram illustrating an example of a mobile terminal device that transmits the release notification when charging is started during a standby state. It is assumed that the processes performed at S203 to S211 illustrated in FIG. 19 are the same as those performed at S203 to S211 illustrated in FIG. 14; therefore, descriptions thereof will be omitted. Furthermore, it is assumed that the processes performed at S501 to S503 illustrated in FIG. 19 are the same as those performed at S501 to S503 illustrated in FIG. 18; therefore, descriptions thereof will be omitted.

If the mobile terminal device 10b determines that it is in a standby state (Yes at S501), the mobile terminal device 10b determines whether it is being charged (S504). If the mobile terminal device 10b determines that it is being charged (Yes at S504), the mobile terminal device 10b transmits the release notification to each of the servers 40, 50, and 51 by performing the processes at S208 to S211. In contrast, if the mobile terminal device 10b determines that it is not being charged (No at S504), the mobile terminal device 10b determines whether to release the standby state (S207).

As described above, if charging is started when the mobile terminal device 10b is in a standby state, the mobile terminal device 10b transmits, to a server that has transmitted the setting notification, the release notification that instructs the resumption of the push email service. Accordingly, if charging is started when the mobile terminal device 10b has transmitted the setting notification and thus if the mobile terminal device 10b does not need to take into consideration saving electrical power, the mobile terminal device 10b can receive the push email service by transmitting the release notification. Consequently, the mobile terminal device 10b can be made more convenient.

(3) Selection of a Delivery Service in Accordance with a Time Slot

When the mobile terminal device according to the present invention shifts to a standby state, the mobile terminal device may also determine whether to stop the push email service in accordance with a previously set time. Accordingly, in the following, a description will be given of a mobile terminal device 10c that determines whether to stop the push email service in accordance with the time at which the mobile terminal device 10c shifts to a standby state.

FIG. 20A is a schematic diagram illustrating an example of a mobile terminal device that determines whether a push email service is stopped in accordance with a time slot. In the example illustrated in FIG. 20A, the mobile terminal device 10c includes a control unit 30b. The control unit 30b includes a standby state managing unit 31b. The mobile terminal device 10c includes a set time table 14a in the memory 13. The set time table 14a contains information indicating a time slot during which the push email service is not stopped.

If the standby state managing unit 31b determines that it will shift the mobile terminal device 10c to a standby state, the standby state managing unit 31b refers to the set time table 14a and determines whether the current time is included in a time slot indicated by the set time table 14a. If the standby state managing unit 31b determines that the current time is included in a time slot indicated by the set time table 14a, the standby state managing unit 31b shifts the mobile terminal device 10c to the standby state without transmitting the setting notification to the server link processing unit 32. In contrast, if the standby state managing unit 31b determines that the current time is not included in a time slot indicated by the set time table 14a, the standby state managing unit 31b transmits the name of the push email service to be stopped and the setting notification to the server link processing unit 32.

FIG. 20B is a flowchart illustrating an example of a process performed by a mobile terminal device that determines whether the push email service is stopped in accordance with a time slot. It is assumed that the processes performed at S203 to S211 illustrated in FIG. 20B are the same as those performed at S203 to S211 illustrated in FIG. 14; therefore, descriptions thereof will be omitted. Furthermore, it is assumed that the processes performed at S601 and S602 illustrated in FIG. 20B are the same as those performed at S501 and S502 illustrated in FIG. 18; therefore, descriptions thereof will be omitted.

If the mobile terminal device 10c determines that it will shift its state to a standby state (Yes at S602), the mobile terminal device 10c reads the set time table 14a (S603). Then, the mobile terminal device 10c determines whether the current time is included in a time slot indicated by the set time table 14a, i.e., in a time slot during which the push email service is not stopped (S604).

If the mobile terminal device 10c determines that the current time is included in a time slot during which the service is not stopped (Yes at S604), the mobile terminal device 10c ends the process without performing the processes at S203 to S206. In contrast, if the mobile terminal device 10c determines that the current time is included in the time slot during which the service is stopped (No at S604), the mobile terminal device 10c performs the processes at S203 to S206 and ends the processes.

As described above, when the mobile terminal device 10c shifts to a standby state, the mobile terminal device 10c determines whether the current time is included in a previously set time slot. If the mobile terminal device 10c determines that the current time is included in a previously set time slot, the mobile terminal device 10c does not transmit the setting notification. In contrast, if the mobile terminal device 10c determines that the current time is not included in a previously set time slot, the mobile terminal device 10c transmits the setting notification and instructs the push email service to stop.

Accordingly, the mobile terminal device 10c can determine whether to receive the push email service in accordance with a time slot while reducing the electrical power consumption. Consequently, with the mobile terminal device 10c, for example, it is possible to always provide the push email service during the user's working hours and to stop the push email service during a standby state except during the user's working hours.

(4) Selection of the Delivery Service in Accordance with an Access Point

When the mobile terminal device according to the present invention shifts to a standby state, the mobile terminal device may also determine whether to stop the push email service on the basis of whether or not the currently connected access point (AP) is a previously set access point. Accordingly, a description will be given of a mobile terminal device 10d that determines whether to stop the push email service on the basis of whether or not the currently connected access point is a previously set access point.

Figure 21A:
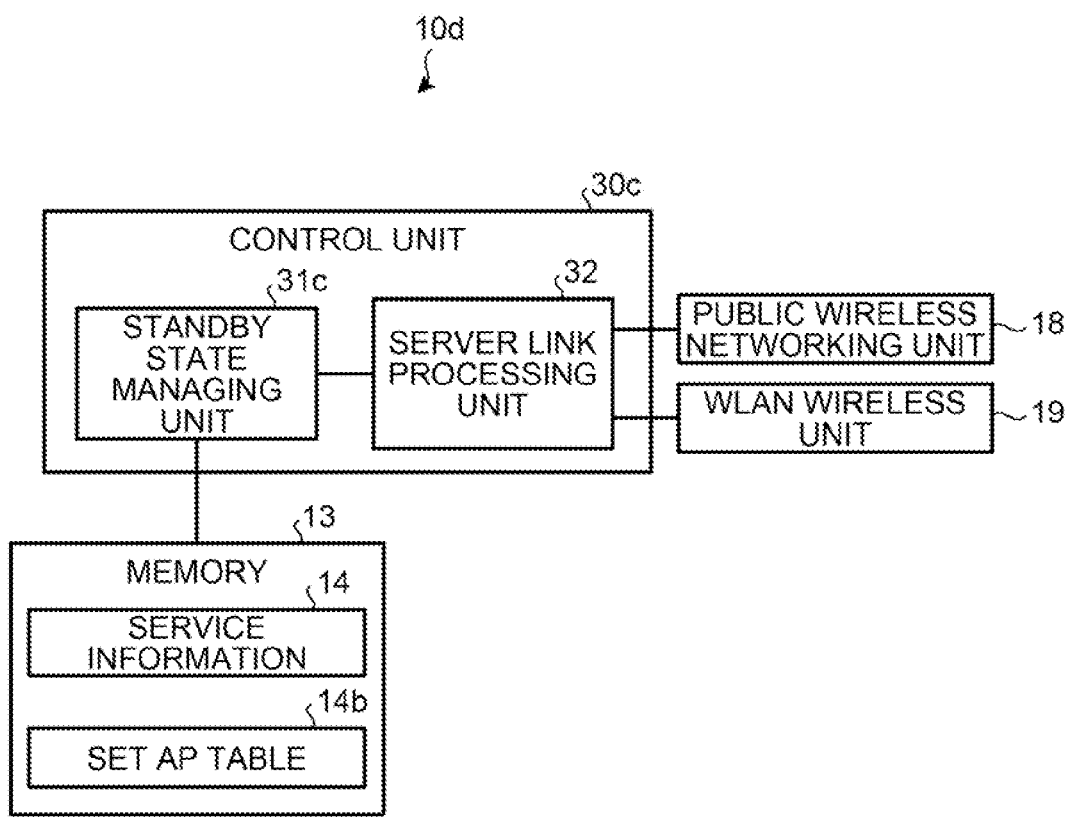
FIG. 21A is a schematic diagram illustrating an example of a mobile terminal device that determines whether the push email service is provided in accordance with an access point.

FIG. 21A is a schematic diagram illustrating an example of a mobile terminal device that determines whether the push email service is provided in accordance with an access point. In the example illustrated in FIG. 21A, the mobile terminal device 10d includes a control unit 30c. The control unit 30c includes a standby state managing unit 31c. The mobile terminal device 10d includes a set AP table 14b in the memory 13. The set AP table 14b contains information indicating access points to which the mobile terminal device 10d is connected.

If the standby state managing unit 31c determines that it will shift the mobile terminal device 10d to a standby state, the standby state managing unit 31c refers to the set AP table 14b and determines whether the currently connected access point is included in the access points indicated by the set AP table 14b. If the standby state managing unit 31c determines that the currently connected access point is included in the access points indicated by the set AP table 14b, the standby state managing unit 31c shifts the state of the mobile terminal device 10c to a standby state without transmitting the setting notification to the server link processing unit 32. In contrast, if the standby state managing unit 31c determines that the currently connected access point is not included in the access points indicated by the set AP table 14b, the standby state managing unit 31c transmits the name of the push email service to be stopped and the setting notification to the server link processing unit 32.

FIG. 21B is a flowchart illustrating an example of a process performed by the mobile terminal device that determines whether the push email service is provided on the basis of an access point. It is assumed that the processes performed at S203 to S211 illustrated in FIG. 21B are the same as those performed at S203 to S211 illustrated in FIG. 14; therefore, descriptions thereof will be omitted. Furthermore, it is assumed that the processes performed at S701 and S702 illustrated in FIG. 21B are the same as those performed at S501 and S502 illustrated in FIG. 18; therefore, descriptions thereof will be omitted.

Namely, if the mobile terminal device 10d determines that it will shift its state to a standby state (Yes at S702), the mobile terminal device 10d reads the set AP table 14b (S703). Then, the mobile terminal device 10d determines whether the currently connected access point is included in the access points indicated by the set AP table 14b (S704).

If the mobile terminal device 10d determines that the currently connected access point is included in the access points indicated by the set AP table 14b (Yes at S704), the mobile terminal device 10d does not perform the process at S203 to S206. Specifically, the mobile terminal device 10d only shifts to the standby state without transmitting the setting notification and then ends the process.

In contrast, if the mobile terminal device 10d determines that the currently connected access point is not included in the access points indicated by the set AP table 14b (No at S704), the mobile terminal device 10d performs the process at S203 to 5206. Specifically, the mobile terminal device 10d transmits the setting notification that instructs the stopping of the push email service.

As described above, when the mobile terminal device 10d shifts to a standby state, the mobile terminal device 10d determines whether the connected access point is a previously set access point. If the mobile terminal device 10d determines that the connected access point is a previously set access point, the mobile terminal device 10d does not transmit the setting notification. If the mobile terminal device 10d determines that the connected access point is not a previously set access point, the mobile terminal device 10d transmits the setting notification.

Accordingly, the mobile terminal device 10d can determine whether to receive the push email service in accordance with the location of the mobile terminal device 10d while reducing electrical power consumption. Consequently, with the mobile terminal device 10d, for example, it is possible to always provide the push email service when the mobile terminal device 10d is connected to the access point to a company and to stop the push email service during a standby state when the mobile terminal device 10d is connected to an access point other than the access point to a company.

(5) Method of Transmitting the Setting Notification

The mobile terminal devices 10 to 10d described above transmit the setting notification that instructs the stopping of the push email service if set conditions are satisfied; however, the embodiments are not limited thereto. For example, the mobile terminal devices 10 to 10d may also further reduce electrical power consumption by transmitting the setting notification at the same time as operating an Always On function to retain the Internet Protocol version 4 (IPv4) address. In the following, a description will be given of a mobile terminal device 10e that transmits the setting notification at the same time as an Always On function is in operation.

Figure 22:
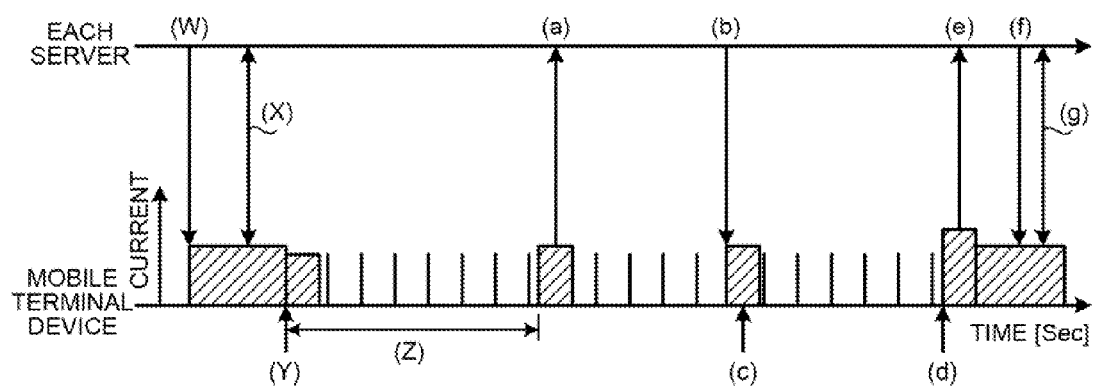
FIG. 22 is a schematic diagram illustrating an example of a process in which a mobile terminal device transmits a setting notification at the same time as the Always On function is in operation.

FIG. 22 is a schematic diagram illustrating an example of a process in which a mobile terminal device transmits a setting notification at the same time as the Always On function is in operation. In the example illustrated in FIG. 22, similarly to the example illustrated in FIG. 7, the horizontal axis indicates the time; the vertical axis indicates the amount of current flowing in the mobile terminal device 10e; and the arrows indicate when data, such as an email, is transmitted and received between the mobile terminal device 10e and each of the servers 40, 50, and 51. Furthermore, in the example illustrated in FIG. 22, similarly to the example illustrated in FIG. 7, it is assumed that the mobile terminal device 10e receives only a push-type email when it is in a standby state.

For example, at the time indicated by the arrow (W) in FIG. 22, the mail server 40 performs the push-type email delivery with respect to the mobile terminal device 10e. Furthermore, at the time indicated by the arrow (X) in FIG. 22, the calendar server 50 or the phone book server 51 synchronizes calendars or phone books, respectively, with the mobile terminal device 10e. If the mobile terminal device 10e determines that it will shift to a standby state at the time indicated by the arrow (Y) in FIG. 22, the mobile terminal device 10e shifts to the standby state without processing anything, for example, without transmitting the setting notification.

Then, as indicated by the arrow (Z) in FIG. 22, the mobile terminal device 10e waits for an Always On operation after it has shifted its state to a standby state and transmits the setting notification at the same time as the Always-On function is in operation, as indicated by the arrow (a) in FIG. 22. Furthermore, as indicated by the arrow (b) in FIG. 22, the mail server 40 performs the push-type email delivery service on the mobile terminal device 10e. If the mobile terminal device 10e receives an email at the time indicated by the arrow (c) in FIG. 22, the mobile terminal device 10e only receives an email without activating a screen.

If the mobile terminal device 10e determines that it will release the standby state at the time indicated by the arrow (d) in FIG. 22, the mobile terminal device 10e transmits the release notification to both the calendar server 50 and the phone book server 51, as indicated by the arrow (e) in FIG. 22. Specifically, for the transmission of the setting notification, the mobile terminal device 10e waits for the Always On operation, and, for the transmission of the setting release notification, the mobile terminal device 10e immediately performs the transmission. As indicated by the arrow (f) in FIG. 22, the mobile terminal device 10e receives an email from the mail server 40 and, as indicated by the arrow (g) in FIG. 22, the mobile terminal device 10e synchronizes calendars or phone books, respectively with the calendar server 50 or the phone book server 51.

As described above, the mobile terminal device 10e has the Always-On function for retaining an IP address. Furthermore, the mobile terminal device 10e shifts to a standby state. If the mobile terminal device 10e transmits the setting notification, it waits until the Always-On function is performed and transmits the setting notification at the same time as the Always-On function is performed. Accordingly, the mobile terminal device 10e can reduces the electrical power needed to transmit the setting notification.

(6) Open of an Allocated IP Address

For example, if the service information 14 indicates that data related to all of the push-type services is not received during the standby state, the mobile terminal devices 10 to 10e may also open the Always-On function in order to release an IP address that is allocated to perform wireless communication. In the following, a description will be given of a mobile terminal device 10f that opens an IP address allocated to the mobile terminal device 10f when it does not receive data related to all of the push-type services during a standby state.

Figure 23:
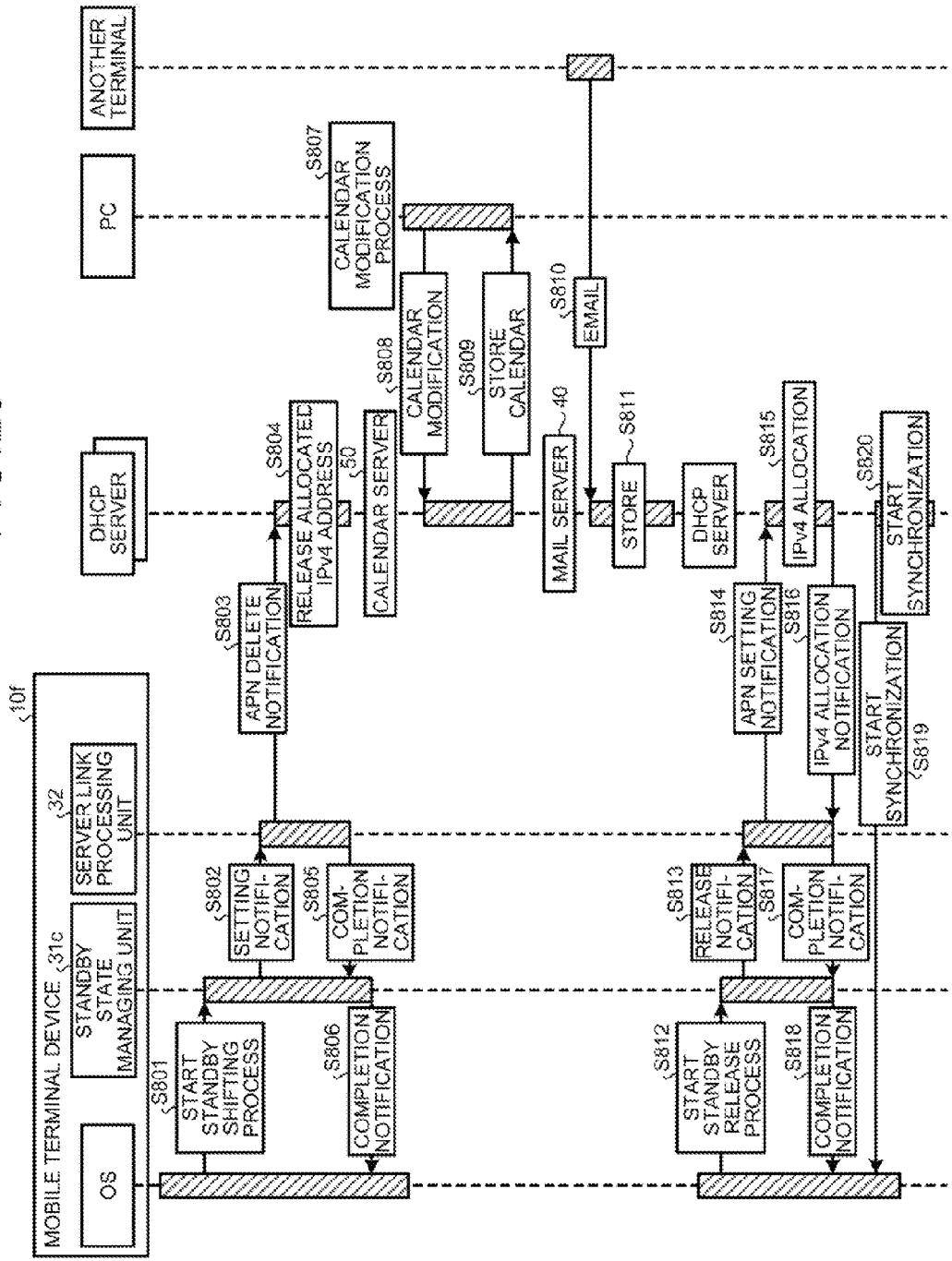
FIG. 23 is a schematic diagram illustrating an example of a process performed by a mobile terminal device that opens an IP address allocated to the mobile terminal device.

FIG. 23 is a schematic diagram illustrating an example of a process performed by a mobile terminal device that opens an IP address allocated to the mobile terminal device. It is assumed that the processes performed at S801-S802 and S805-S806 illustrated in FIG. 23 are the same as those performed at S101-S103 and S106-S107 illustrated in FIG. 8; therefore, descriptions thereof will be omitted.

Furthermore, the processes performed S812-S813 and S817-S818 illustrated in FIG. 23 are the same as those performed at S115-S116 and S119-S120 illustrated in FIG. 8; therefore, descriptions thereof will be omitted. Furthermore, it is assumed that the processes performed at S807 to S810 illustrated in FIG. 23 are the same as those performed at S108 to S112 illustrated in FIG. 8; therefore, descriptions thereof will be omitted.

Namely, if the standby state managing unit 31c determines that the mobile terminal device 10f will shift to a standby state and if the service information 14 indicates that all of the push-type services are stopped during the standby state, the mobile terminal device 10f performs the following process. Namely, the mobile terminal device 10f transmits an access point name (APN) delete notification to a dynamic host configuration protocol (DHCP) server (S803).

Accordingly, the DHCP server opens the IPv4 address allocated to the mobile terminal device 10f (S804). Because an IPv4 address is not allocated to the mobile terminal device 10f at this time, the mail server 40 or the calendar server 50 does not transmit an email or data even if an email or a calendar to be sent to the mobile terminal device 10f needs to be modified.

If the mobile terminal device 10f releases the standby state (S812 and S813), the mobile terminal device 10f transmits, to the DHCP server, an APN setting notification that requests the allocation of an IPv4 address (S814). In such a case, the DHCP server allocates an IPv4 to the mobile terminal device 10f (S815). Then, the mobile terminal device 10f receives the allocated the IPv4 (S816). Thereafter, the mobile terminal device 10f synchronizes with each server and performs a synchronization process for receiving, for example, data for receiving an email or for updating a calendar (S819 and S820).

As described above, if the mobile terminal device 10f determines that it will release the standby state and if the service information 14 indicates that data on all of the push email services is not received during the standby state, the DHCP server releases the allocated IPv4 address and the Always-On function. Accordingly, the mobile terminal device 10f can prevent IPv4 address exhaustion. Furthermore, the mobile terminal device 10f can reduce the electrical power consumed for the operation of the Always-On function, thus reducing the overall electrical power consumption.

(7) Process for Stopping Push-Type Service

With the mobile terminal devices 10 to 10f described above, if a predetermined condition is satisfied, the push-type service is stopped by transmitting the setting notification; however, the embodiments are not limited thereto. For example, if the mobile terminal devices 10 to 10f are in a standby state, instead of stopping the push-type service, the mobile terminal devices 10 to 10f may also update a value indicating the frequency of data delivery related to the push-type service to a value lower than that usually used.

For example, each of the mobile terminal devices 10 to 10f transmits, to the mail server 40, an instruction to reduce the frequency with which push-type emails are received when it is in a standby state. In such a case, the mail server 40 transmits an email for each mobile terminal device 10 to 10f at a previously set frequency.

Figures 24, 25:
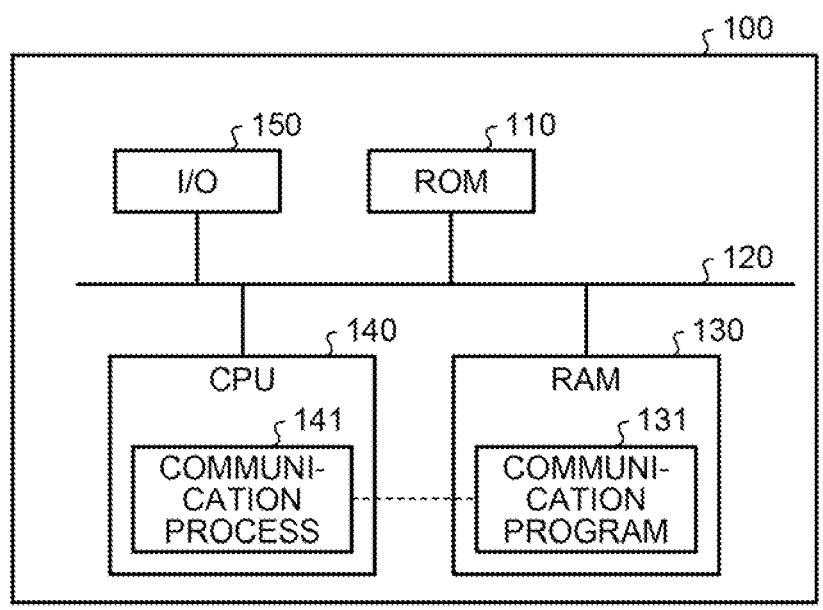
FIG. 24 is a schematic diagram illustrating an example of a synchronization control association table according to the second embodiment.
FIG. 25 is a schematic diagram illustrating an example of a mobile terminal device that executes a communication program.
Figure 26:
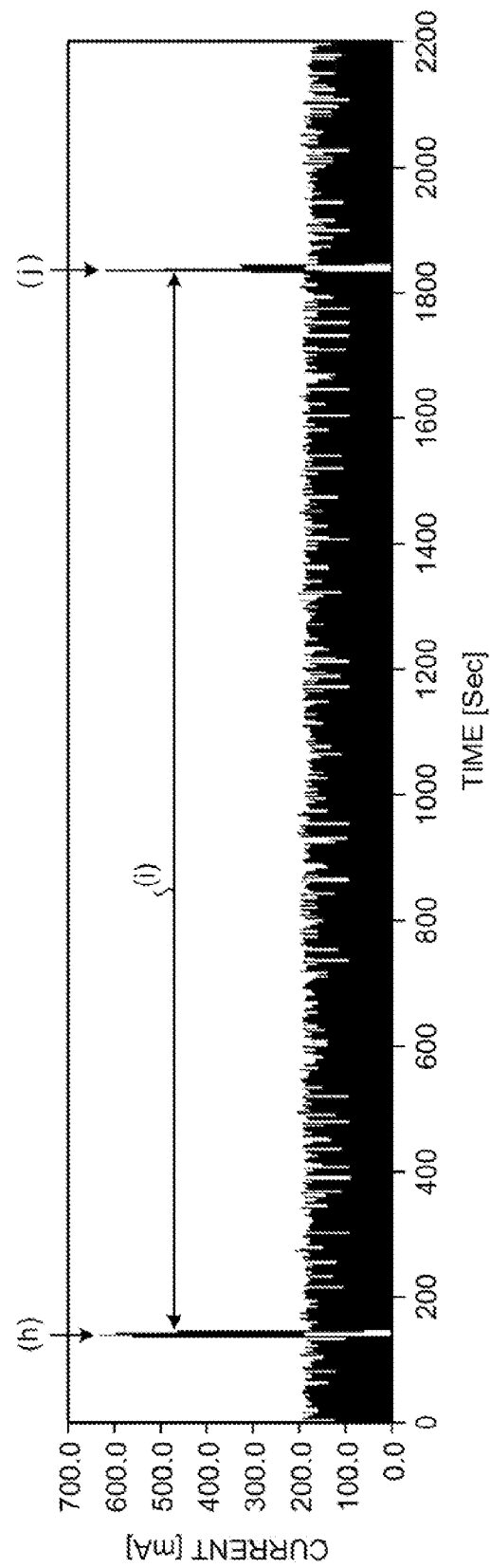
FIG. 26 is a schematic diagram illustrating an example of an Always-ON function performed by a mobile terminal device.
Figure 27:
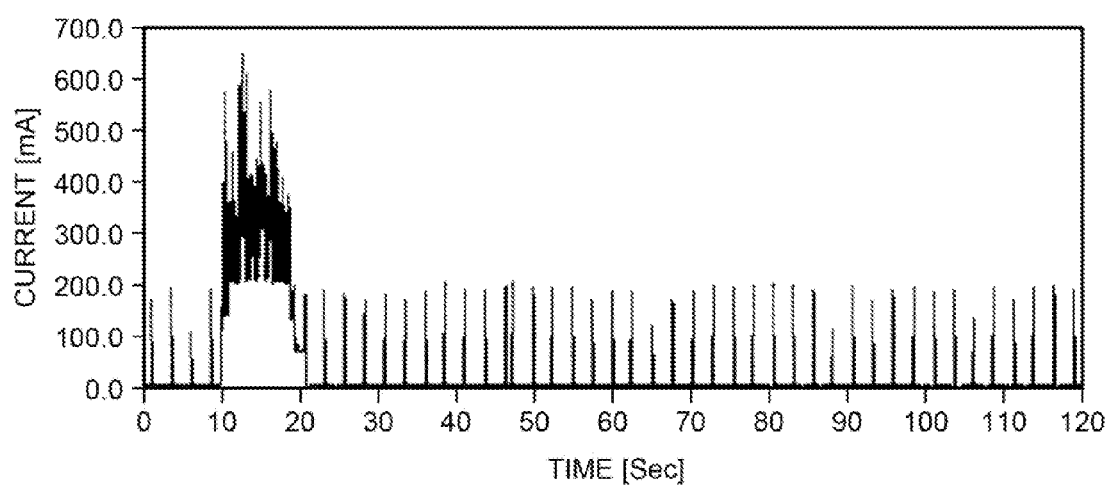
FIG. 27 is a schematic diagram illustrating an example of the amount of electrical power consumed when a mobile terminal device synchronizes with a server in the 3G network.

FIG. 24 is a schematic diagram illustrating an example of a synchronization control association table according to the second embodiment. In the example illustrated in FIG. 24, the synchronization control association table 42a stores therein, in an associated manner, an email address of each mobile terminal device, control information, and frequency information that indicates the frequency with which emails are transmitted.

In this case, the control information "1" indicates that an email is transmitted at a previously set frequency. Specifically, in the example illustrated in FIG. 24, the mail server 40 transmits two emails whose destination is the mobile terminal device having the email address of "aaa.111@fj.com" at a time. The control information "0" indicates that the mail delivery service is stopped. Specifically, in the example illustrated in FIG. 24, the mail server 40 retains an email whose destination is the mobile terminal device having the email address of "aaa.222@fj.com" without transmitting it.

The control information "2" indicates that an email is transmitted at a normal frequency. Specifically, in the example illustrated in FIG. 24, the mail server 40 transmits an email whose destination is the mobile terminal device having the email address of "aaa.333.fj.com" every time the mail server 40 receives it.

If the mail server 40 that has such a synchronization control association table 42a receives, from the mobile terminal having the email address of "aaa.333@fj.com", an instruction, for example, to reduce the frequency of the email transmissions, the mail server 40 performs the following process. Namely, the mail server 40 updates the control information "2", which is associated with the email address of "aaa.333@fj.com" in the synchronization control association table 42a, to "1".

Then, in accordance with the updated synchronization control association table 42a, the mail server 40 performs the push-type email delivery service. The process for reducing the delivery frequency of data related to the push email service described above may also be used not only by the mail server 40 but also by the calendar server 50 or the phone book server 51.

(8) Relationship Between Embodiments

The processes performed by the mobile terminal devices 10 to 10f according to the embodiments described above may also be performed in any combination as long as the processes do not conflict with each other. For example, the mobile terminal device 10f may also perform the process performed by the other mobile terminal devices 10 to 10e.

When the mobile terminal devices 10 to 10f are connected to a wireless communication network, for example a 3G network, the mobile terminal devices 10 to 10f can appropriately reduce the electrical power consumption not only when an IPv4 is allocated but also when an IPv6 is allocated. Specifically, the mobile terminal devices 10 to 10f can reduce the electrical power consumption even if they do not use the Always-On function.

(9) Program

In the above explanation, a description has been given of a case in which the mobile terminal devices 10 to 10f implement various processes by using hardware; however, the embodiments are not limited thereto. For example, the processes may also be implemented by a program prepared in advance and executed by a CPU included in the mobile terminal device 10. Accordingly, in the following, an example of a mobile terminal device that executes a program having the same function as that performed by the mobile terminal device 10 according to the first embodiment will be described with reference to FIG. 25. FIG. 25 is a schematic diagram illustrating an example of a mobile terminal device that executes a communication program.

A mobile terminal device 100 illustrated in FIG. 25 includes a read only memory (ROM) 110, a random access memory (RAM) 130, a CPU 140, an input/output (I/O) 150, which are connected by a bus 120.

The RAM 130 previously stores therein a communication program 131. The CPU 140 reads the communication program 131 and executes it so that the communication program 131 can function as a communication process 141, in the example illustrated in FIG. 25. The communication process 141 has the same function as that performed by the control unit 30 illustrated in FIG. 2. Furthermore, the communication process 141 may also have the same function as that performed by the control unit according to the mobile terminal devices 10a to 10f in the second embodiment.

The program described in the embodiment can be implemented by a program prepared in advance and executed by a terminal, such as a mobile terminal device or a computer that can perform wireless communication. The program can be sent using a network such as the Internet. Furthermore, the program can be stores in a recording medium, such as a hard disk drive, a flexible disk (FD), a compact disc read only memory (CD-ROM), a magneto optical disc (MO), and a digital versatile disc (DVD), that can be read by the terminal. Furthermore, the program can also be implemented by the terminal reading it from the recording medium.

According to an aspect of the present invention, electrical power consumed by a mobile terminal device is reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal device that receives information related to a push service from a server that provides the push service via a wireless communication network, the mobile terminal device comprising:
   a storing unit that stores therein setting information indicating whether the information related to the push service is received when the mobile terminal device is in a standby state;
   a determining unit that determines whether the state of the mobile terminal device will be shifted to the standby state; and
   a transmitting unit that transmits, to the server that provides the push service when the determining unit determines that the state of the mobile terminal device will be shifted to the standby state, a setting notification that instructs stopping of the push service on the basis of the setting information stored in the storing unit.

2. The mobile terminal device according to claim 1, wherein the storing unit stores therein, for each type of service, the setting information indicating whether the information related to the push service is received when the mobile terminal device is in the standby state.

3. The mobile terminal device according to claim 1, wherein
   when the state of the mobile terminal device is the standby state, the determining unit determines whether to release the standby state of the mobile terminal device, and
   when the determining unit determines that the determining unit will release the standby state of the mobile terminal device, the transmitting unit transmits a release notification that instructs resumption of the push service to the server to which the setting notification that instructs the stopping of the push service has been transmitted.

4. The mobile terminal device according to claim 3, further comprising a shifting unit that shifts the state of the mobile terminal device to the standby state when the determining unit determines that the state of the mobile terminal device will be shifted to the standby state, wherein
   when the standby state is not released for a predetermined time period after the shifting unit has shifted the state of the mobile terminal device to the standby state, the transmitting unit transmits, to the server that provides the push service, the setting notification that instructs the stopping of the push service on the basis of the setting information stored in the storing unit.

5. The mobile terminal device according to claim 1, wherein, when the mobile terminal device is being charged when the determining unit determines that the state of the mobile terminal device will be shifted to the standby state, the transmitting unit does not transmit the setting notification to the server that provides the push service.

6. The mobile terminal device according to claim 1, wherein, when the charging of the mobile terminal device is started when the state of the mobile terminal device is the standby state, the transmitting unit transmits a release notification that instructs the resumption of the push service to the server to which the setting notification that instructs the stopping of the push service has been transmitted.

7. The mobile terminal device according to claim 1, wherein
   when the determining unit determines that the state of the mobile terminal device will be shifted to the standby state, the determining unit determines whether the current time is included in a previously set time slot,
   when the determining unit determines that the current time is included in the previously set time slot, the transmitting unit does not transmit the setting notification to the server that provides the push service, and when the determining unit determines that the current time is not included in the previously set time slot, the transmitting unit transmits the setting notification to the server that provides the push service.

8. The mobile terminal device according to claim 1, wherein when the determining unit determines that the state of the mobile terminal device will be shifted to the standby state, the determining unit determines whether a currently connected access point is a previously set access point, when the determining unit determines that the currently connected access point is the previously set access point, the transmitting unit does not transmit the setting notification to the server that provides the push service, and when the determining unit determines that the currently connected access point is not the previously set access point, the transmitting unit transmits the setting notification to the server that provides the push service.

9. The mobile terminal device according to claim 1, wherein the transmitting unit transmits, to the server that provides the push service, a setting notification that instructs a decrease in the frequency with which information related to the push service is transmitted.

10. The mobile terminal device according to claim 1, further comprising a synchronizing unit that synchronizes with a server in the wireless communication network in order to retain an IP address allocated to the mobile terminal device, wherein when the determining unit determines that the state of the mobile terminal device will be shifted to the standby state, the transmitting unit transmits, at the same time as the synchronizing unit synchronizes with the server in the wireless communication network, the setting notification that instructs the stopping of the push service to the server that provides the push service on the basis of the setting information stored in the storing unit.

11. The mobile terminal device according to claim 1, wherein, when the determining unit determines that the state of the mobile terminal device will be shifted to the standby state and when the setting information stored in the storing unit indicates that information related to all push services is not received when the mobile terminal device is in the standby state, the transmitting unit transmits, to a server that allocates an IP address, an open notification that instructs opening of the IP address that is allocated to the mobile terminal device for wireless communication.

12. A communication system comprising:
a server that provides a push service via a wireless communication network; and
multiple mobile terminal devices each of which receives information related to the push service from the server via the wireless communication network, wherein
each of the mobile terminal devices includes
a storing unit that stores therein setting information that indicates whether the information related to the push service is received when the mobile terminal device is in a standby state,
a determining unit that determines whether the state of the mobile terminal device will be shifted to the standby state, and
a transmitting unit that transmits, to the server when the determining unit determines that the state of the mobile terminal device will be shifted to the standby state, a setting notification that instructs stopping of the push service on the basis of the setting information stored in the storing unit, and the server includes
a receiving unit that receives the setting notification from the mobile terminal device,
a transmission determining unit that determines whether the information related to the push service will be transmitted to the mobile terminal device on the basis of the setting notification received by the receiving unit, and
an information transmitting unit that does not transmit the information related to the push service to a mobile terminal device that the transmission determining unit determines not to transmit the information related to the push service and that transmits the information related to the push service to a mobile terminal device that the transmission determining unit determines to transmit the information related to the push service.

13. A non-transitory computer-readable recording medium having stored therein a communication program executed by a mobile terminal device that receives information related to a push service from a server that provides the push service via a wireless communication network, the communication program for causing a computer to execute a process comprising:
determining whether the state of the mobile terminal device will be shifted to a standby state; and
transmitting, to the server when it is determined that the state of the mobile terminal device will be shifted to the standby state, a setting notification that instructs stopping of the push service on the basis of setting information that indicates whether the mobile terminal device receives the information related to the push service when the mobile terminal device is in the standby state.

14. A control method performed by a mobile terminal device that receives information related to a push service from a server that provides the push service via a wireless communication network, the control method comprising:
determining whether the state of the mobile terminal device will be shifted to a standby state; and
transmitting, to the server when it is determined that the state of the mobile terminal device will be shifted to the standby state, a setting notification that instructs stopping of the push service on the basis of setting information that indicates whether the mobile terminal device receives the information related to the push service when the mobile terminal device is in the standby state.

* * * * *